United States Patent [19]

Wong

[11] Patent Number: 5,187,721
[45] Date of Patent: Feb. 16, 1993

[54] FREQUENCY SHIFT KEYING MODULATOR

[75] Inventor: Hee Wong, San Jose, Calif.

[73] Assignee: National Semiconductor Corporation, Santa Clara, Calif.

[21] Appl. No.: 671,950

[22] Filed: Jul. 8, 1991

Related U.S. Application Data

[62] Division of Ser. No. 21,918, Mar. 4, 1987, Pat. No. 5,027,372.

[51] Int. Cl.$^5$ .............................................. H03C 3/00
[52] U.S. Cl. ...................................... 375/62; 332/101
[58] Field of Search ................ 375/62, 65; 332/100, 332/101, 102; 364/721

[56] References Cited

U.S. PATENT DOCUMENTS

| | | | |
|---|---|---|---|
| 3,890,581 | 6/1975 | Stuart | 332/101 |
| 4,748,640 | 5/1988 | Staley et al. | 332/101 |
| 5,053,728 | 10/1991 | Bögl | 332/100 |

Primary Examiner—Benedict V. Safourek
Attorney, Agent, or Firm—Limbach & Limbach

[57] ABSTRACT

The present invention provides a modulator/generator circuit which includes the following features: a 1200 baud 4-phase differential phase shift keying (DPSK) modulator, a 300 baud frequency shift keying (FSK) modulator, a dual tone multi-frequency (DTMF) generator and 2100/2225 Hz answer tone generators. The DPSK modulator utilizes time-domain filtering techniques. It includes a spectrum controller that shapes the in-band frequency spectrum and attenuates the adjacent channel frequency components to eliminate the conventional requirement of band-pass filters after the modulator. The FSK modulator also utilizes a spectrum controller which, during each data transition, sends out six intermediate frequencies to smooth the frequency changeover. DTMF generation is accomplished by multiplexing two sine-wave counters into a DPSK sine-wave look-up ROM. By varying the duty cycle of the multiplexing control signal, the DTMF generator provides a digital pre-emphasis function that boosts the amplitude of the high-band frequencies as referenced to the low-band frequencies. The answer tone section of the circuit is accomplished by sharing portions of the FSK section since the two tones are embedded in the FSK frequencies. A digital DAC is provided for converting the modulated signal (parallel) to a serial bit stream. The modulated signal in analog form is available after a low cost low pass filter.

2 Claims, 19 Drawing Sheets

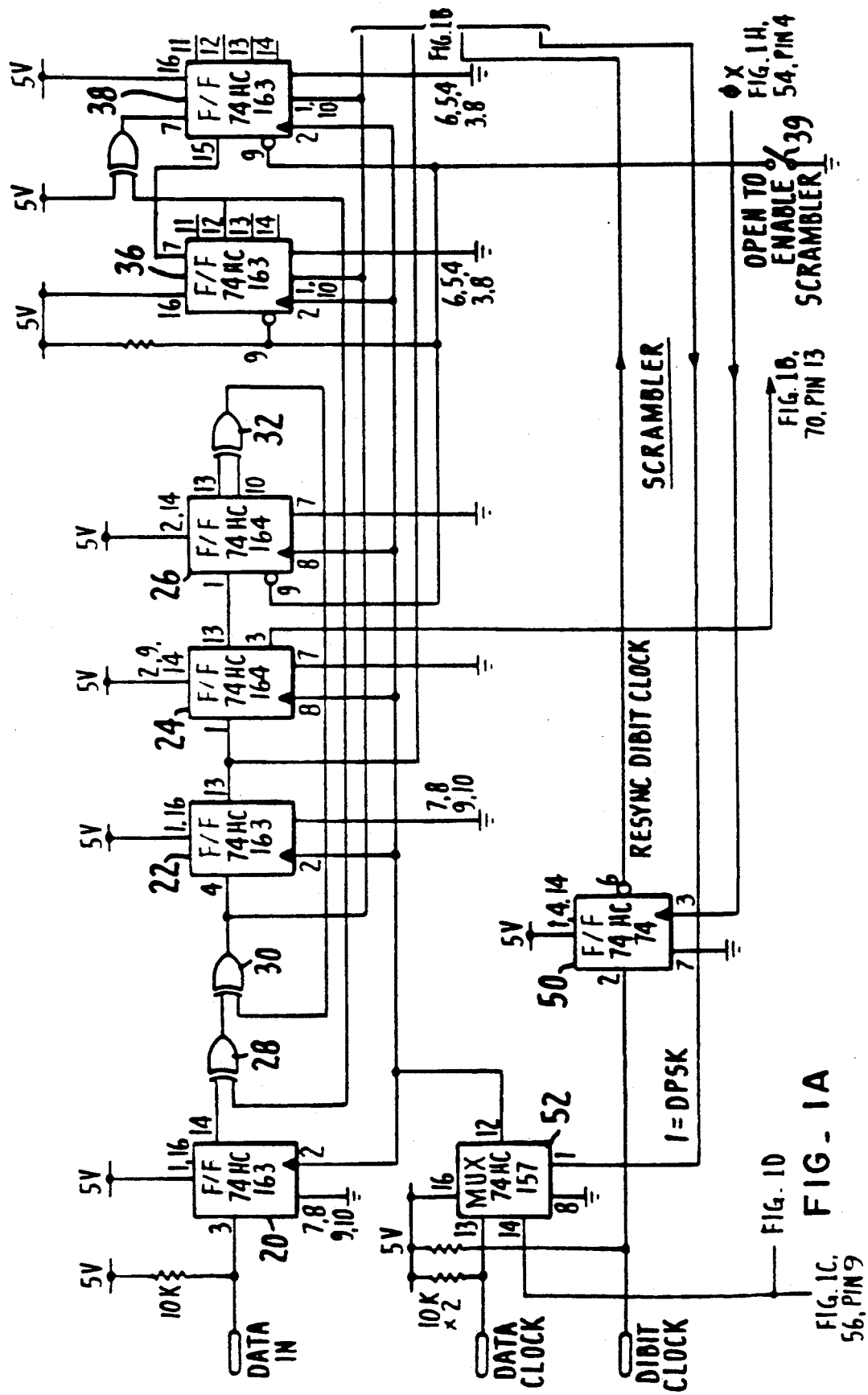

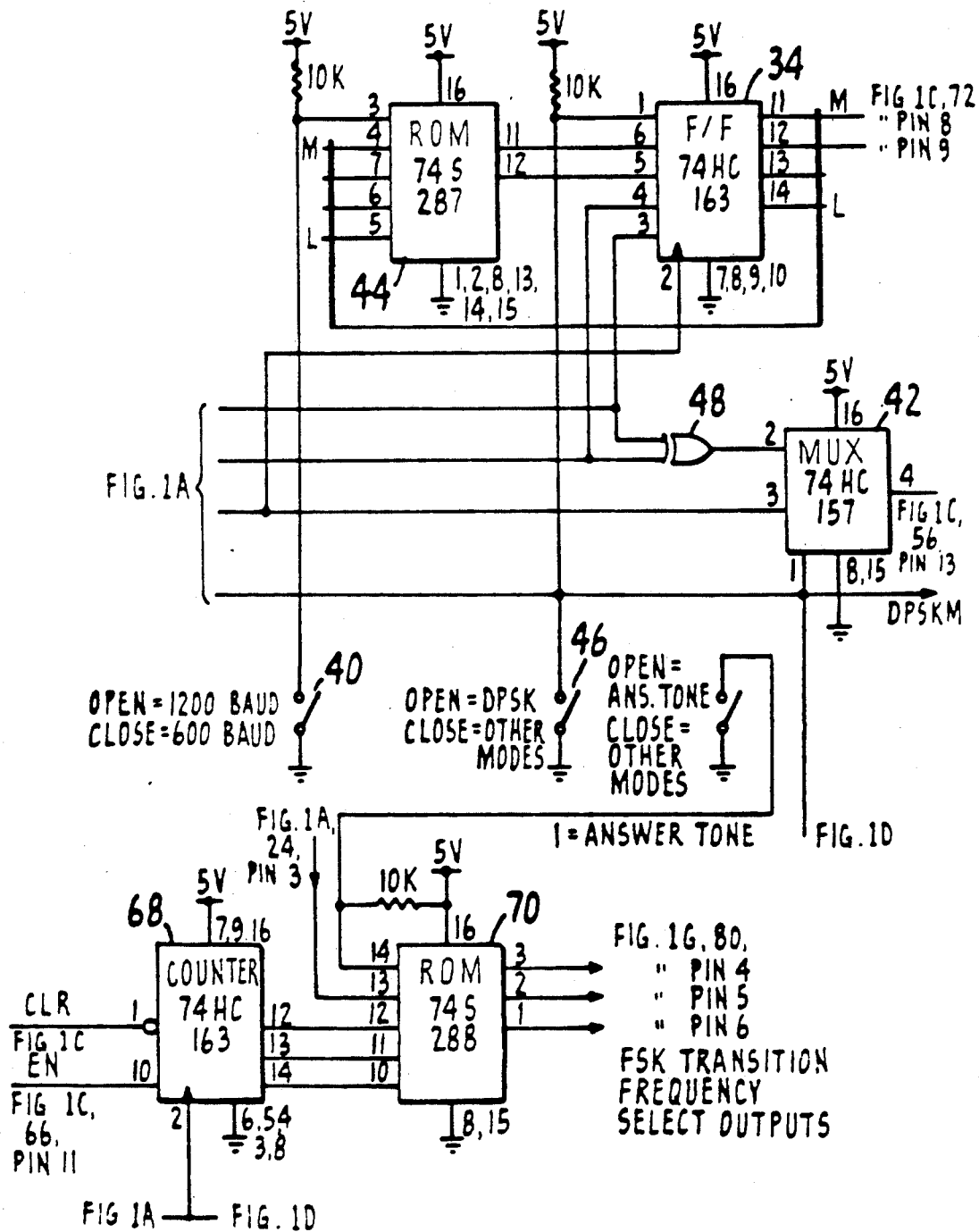
FIG_1B

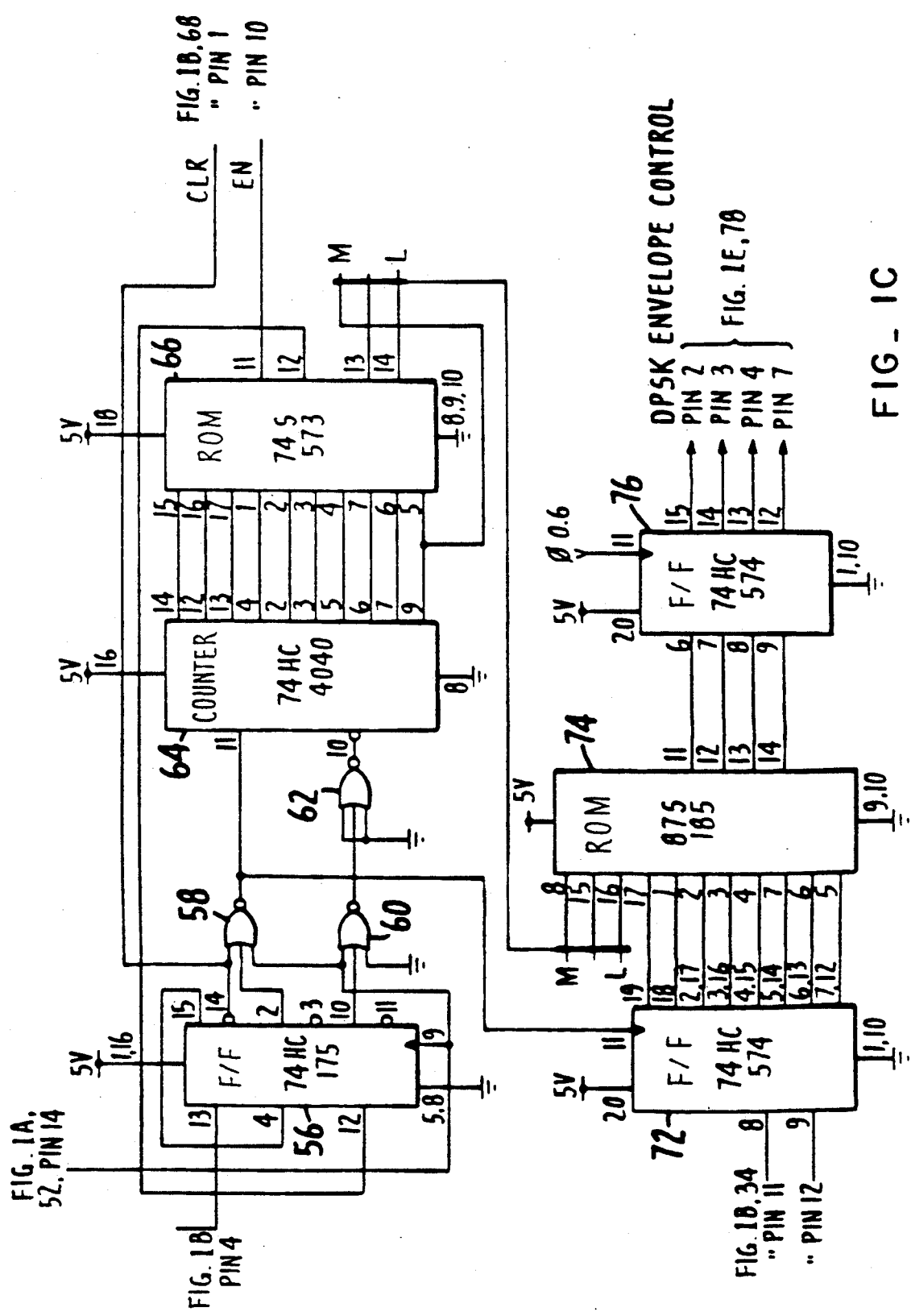

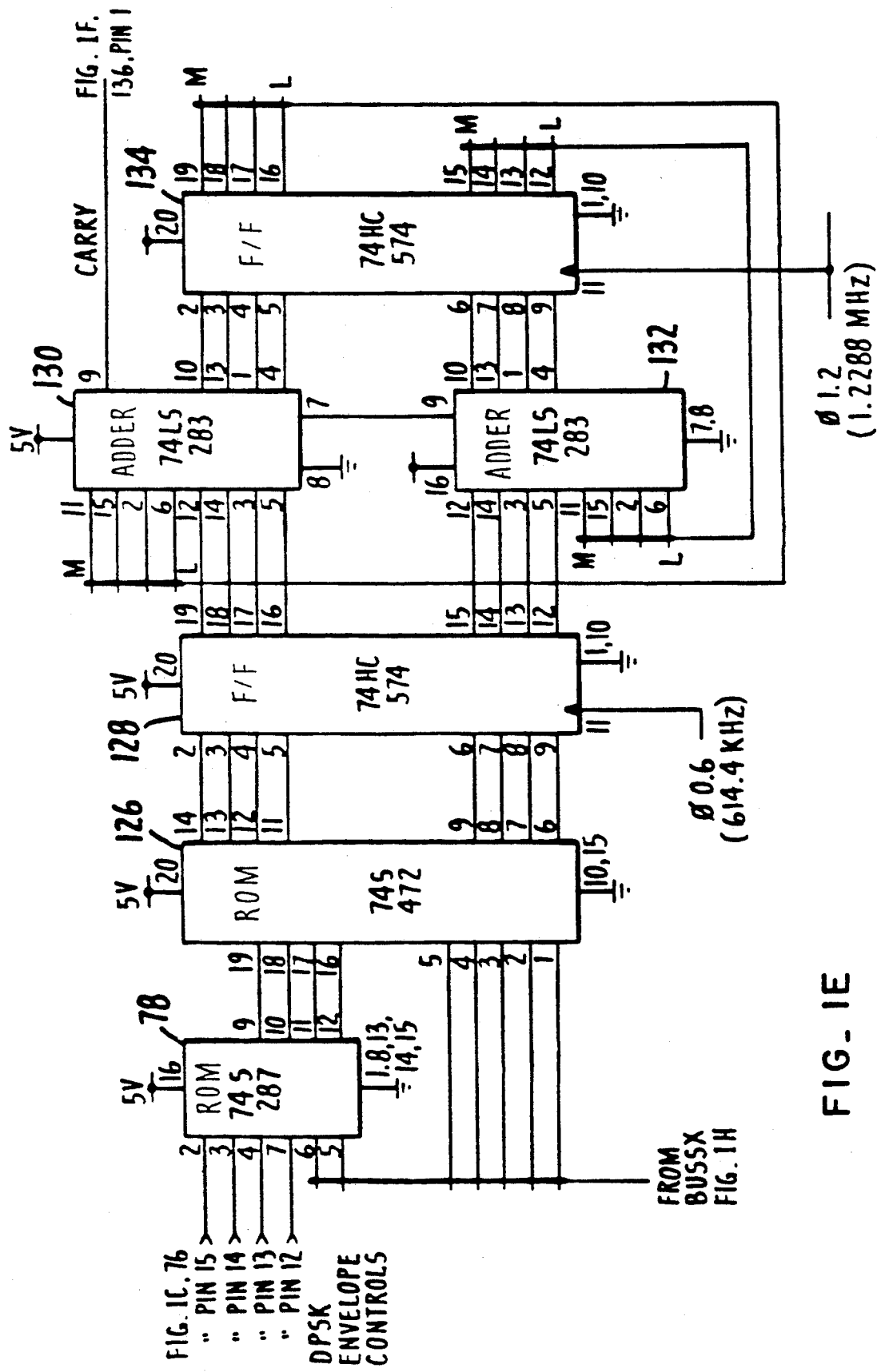
FIG._1E

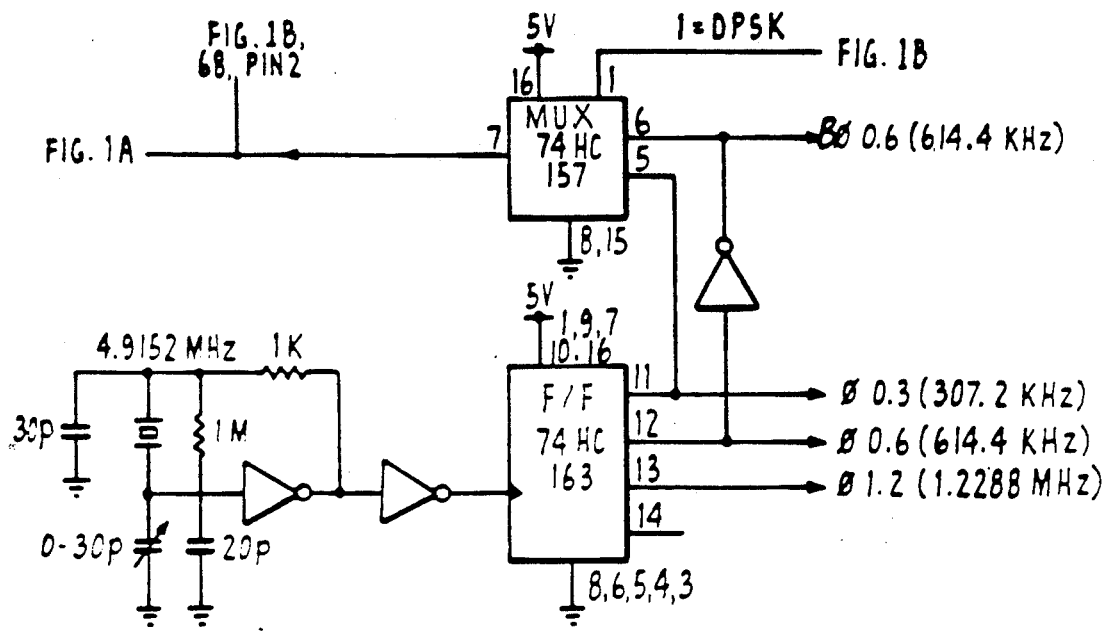
FIG_ 1D
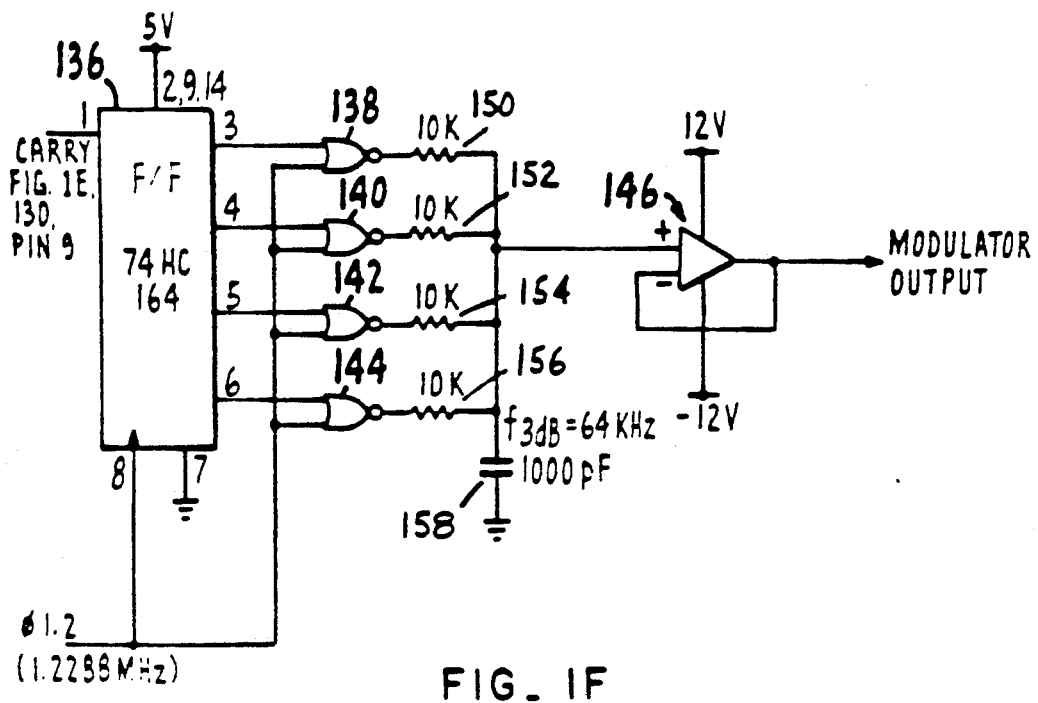
FIG_ 1F

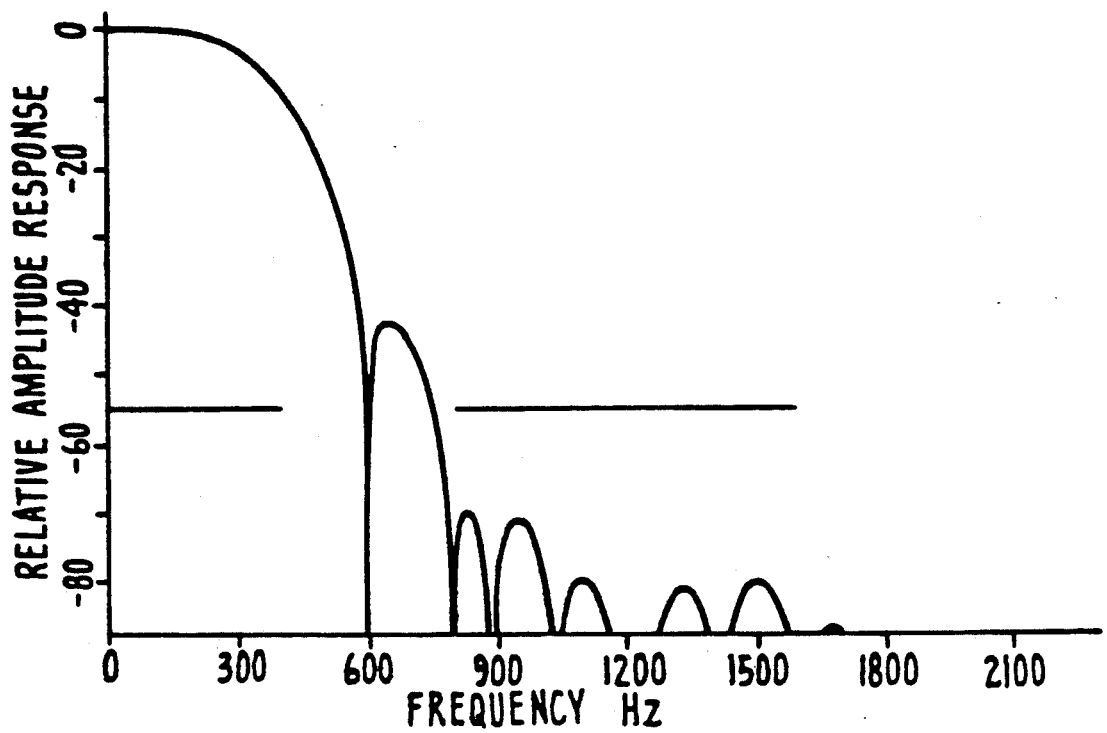
FIG_3
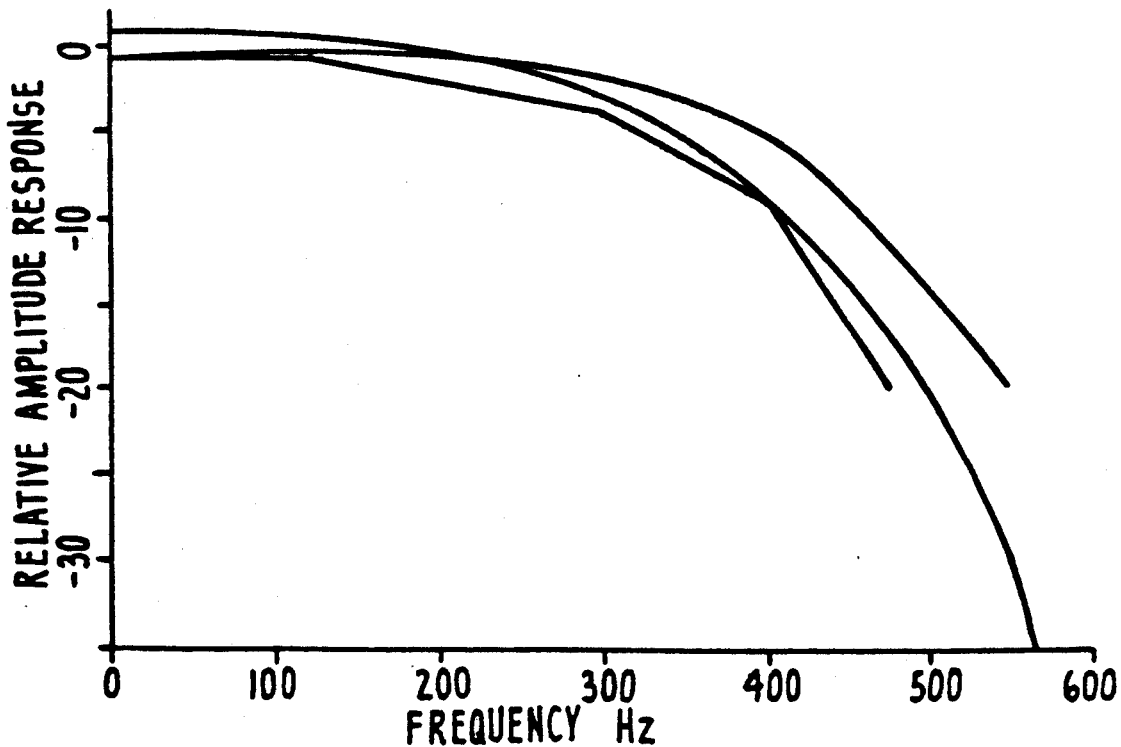
FIG_4

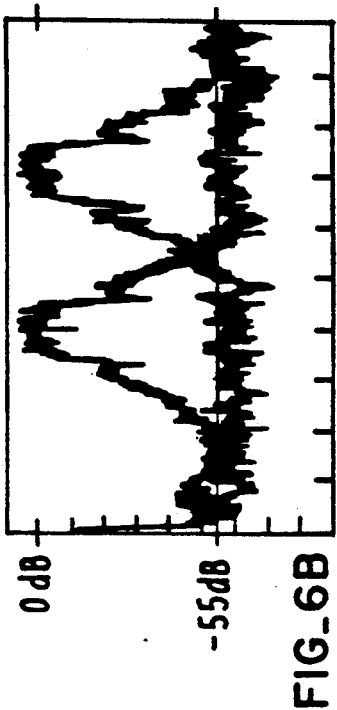
FIG._6B
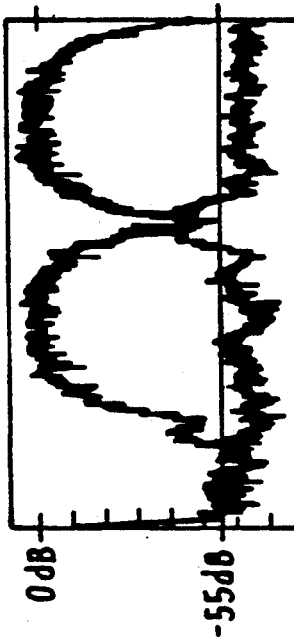
FIG._6A
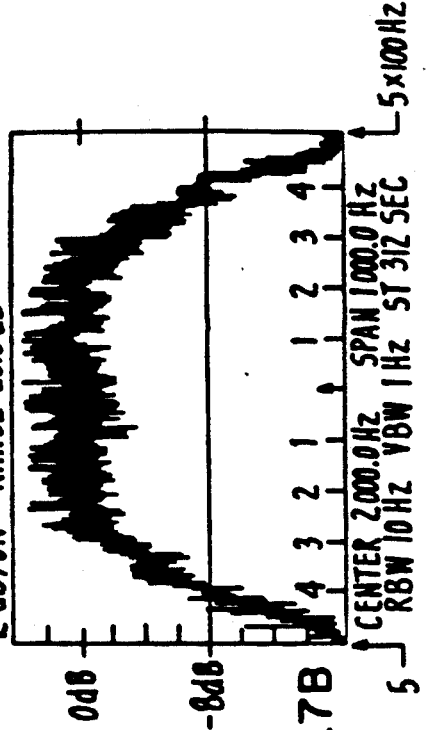
FIG._7B
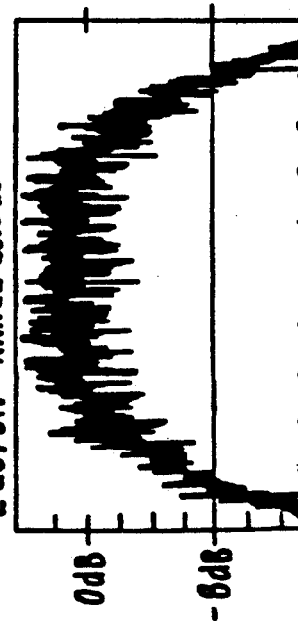
FIG._7A

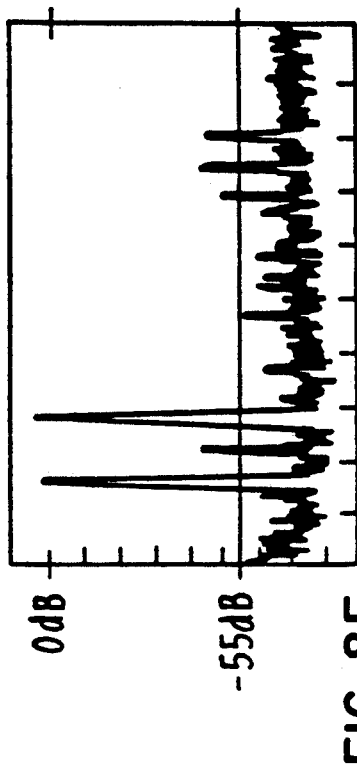
FIG._8F  INPUT=5, KEY="5"
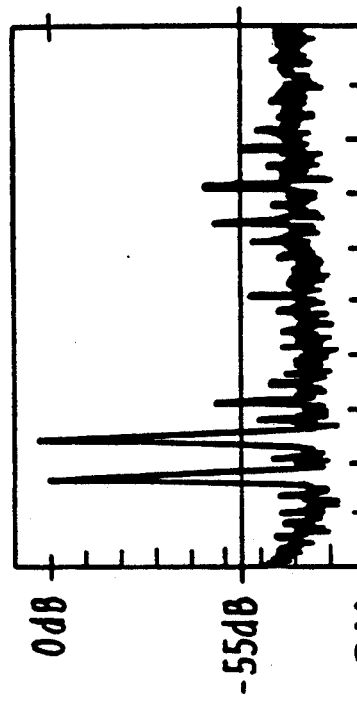
FIG._8H  INPUT=7, KEY="7"
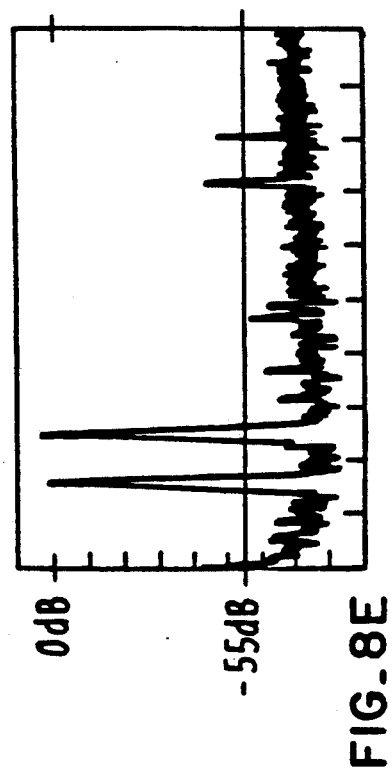
FIG._8E  INPUT=4, KEY="4"
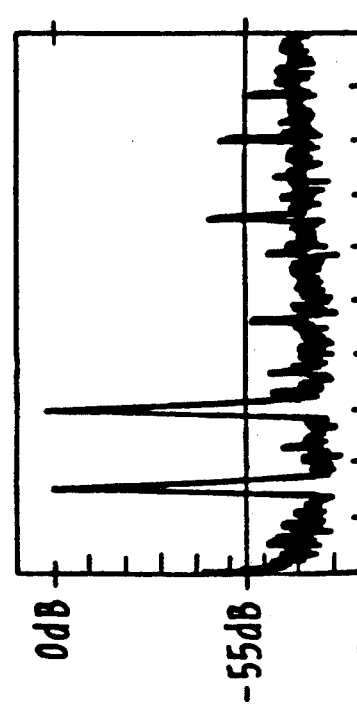
FIG._8G  INPUT=6, KEY="6"

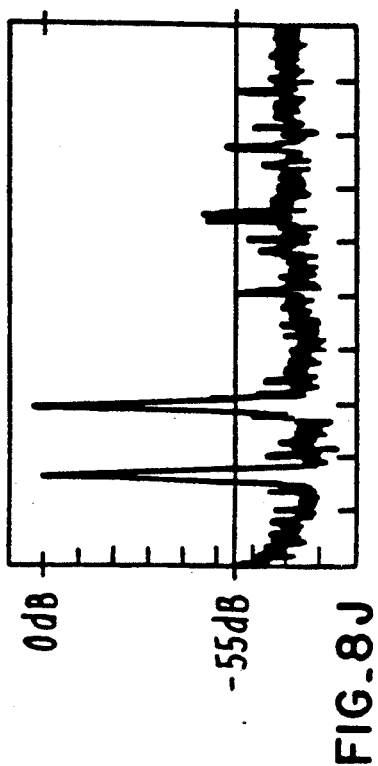
FIG._8I  INPUT = 8, KEY="8"
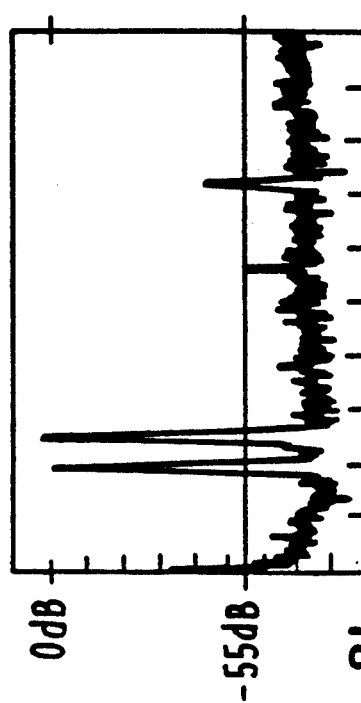
FIG._8J  INPUT = 9, KEY="9"
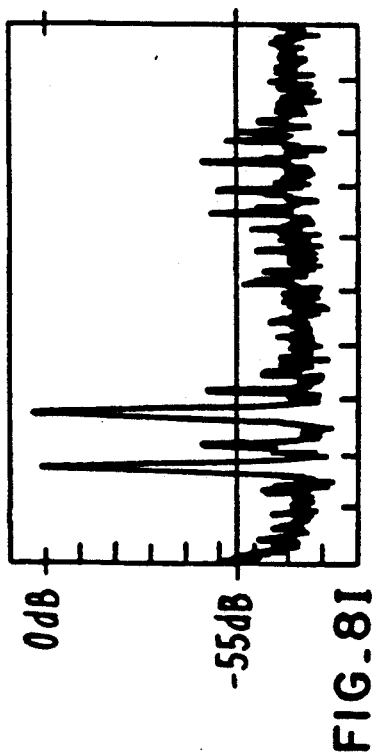
FIG._8K  INPUT = 10, KEY="0"
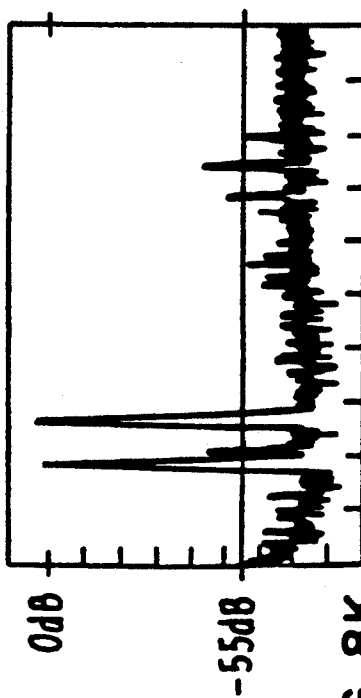
FIG._8L  INPUT = 11, KEY="*"

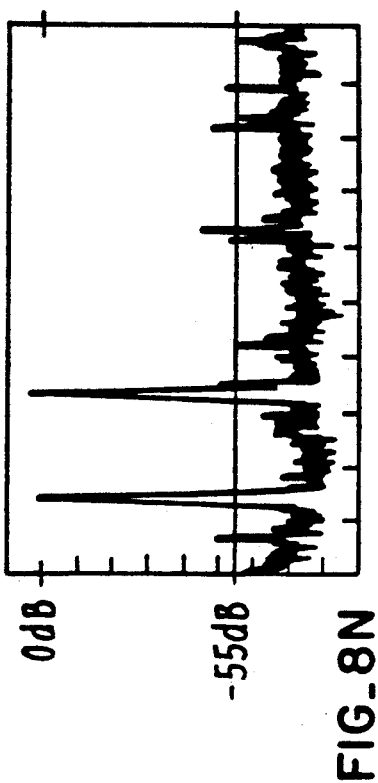
FIG._8N
INPUT=13, KEY="A"
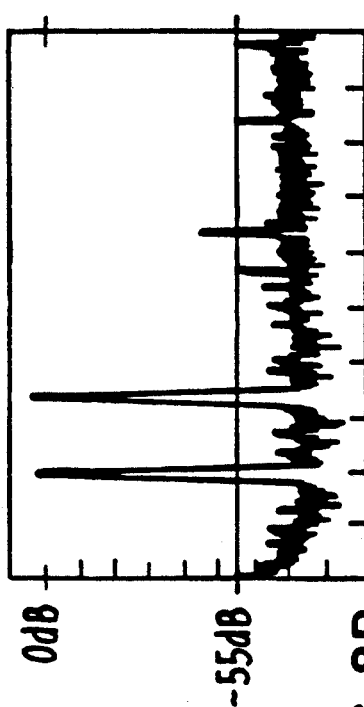
FIG._8P
INPUT=15, KEY="C"
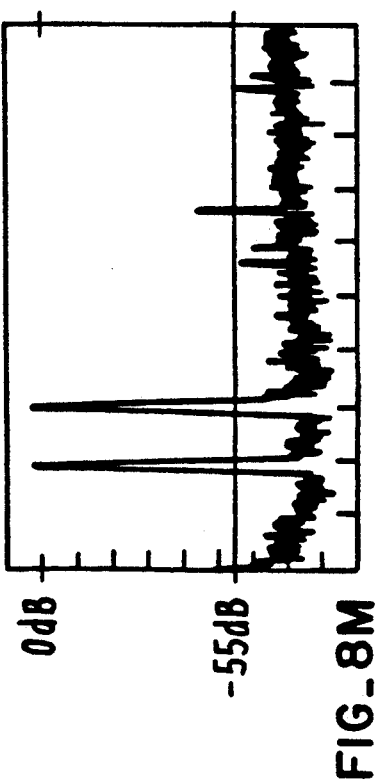
FIG._8M
INPUT=12, KEY="#"
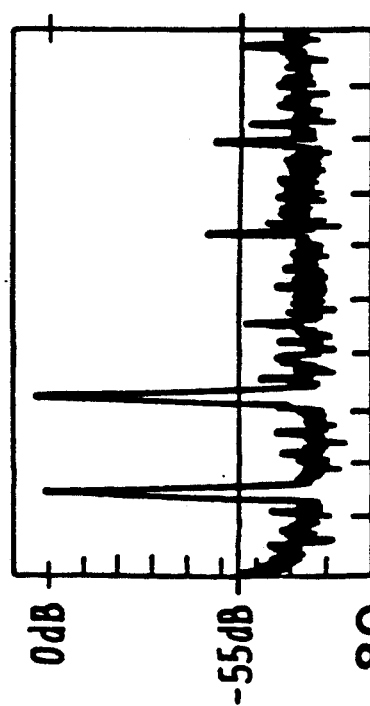
FIG._8O
INPUT=14, KEY="B"

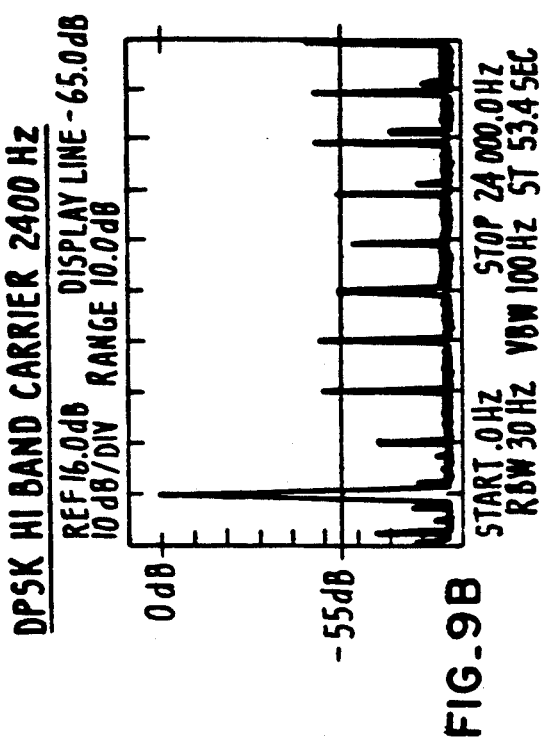
FIG._9B
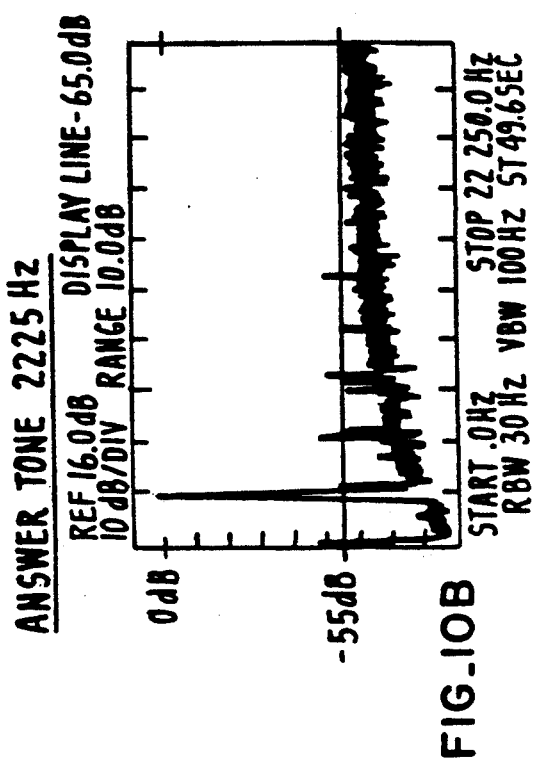
FIG._10B
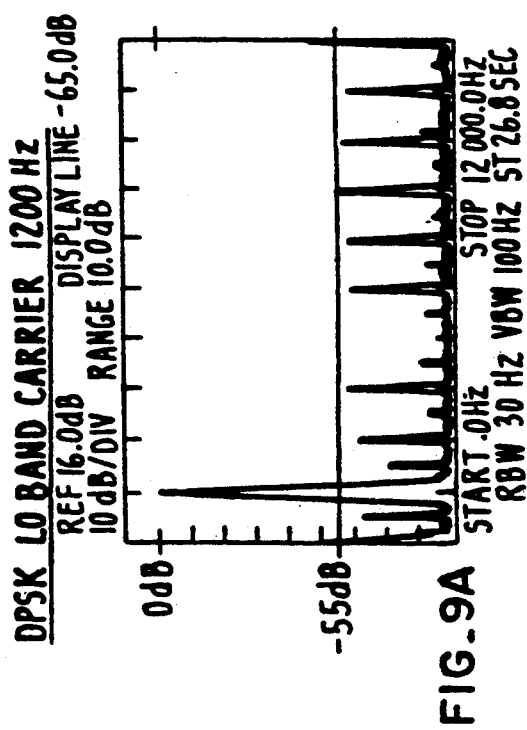
FIG._9A
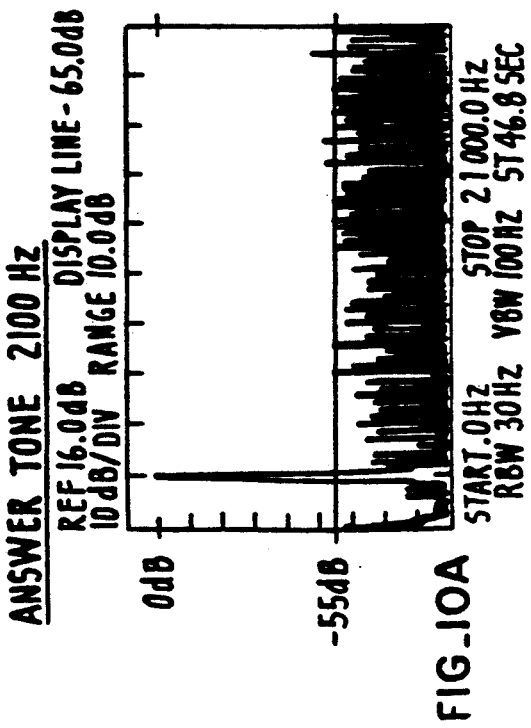
FIG._10A

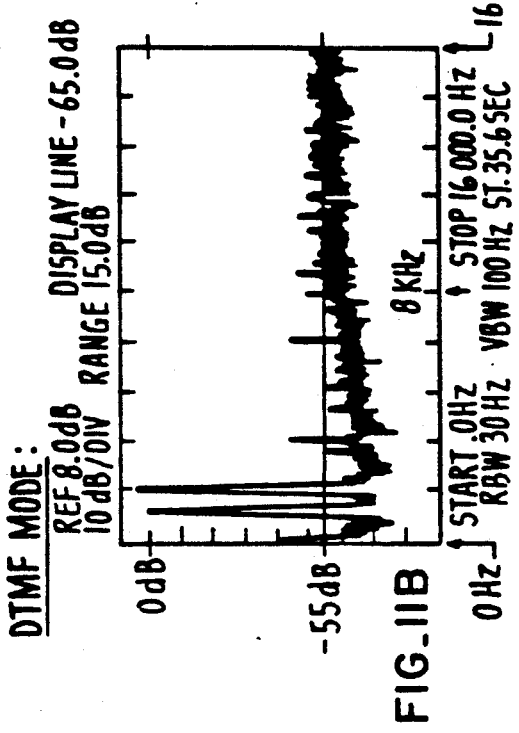
FIG._IIB
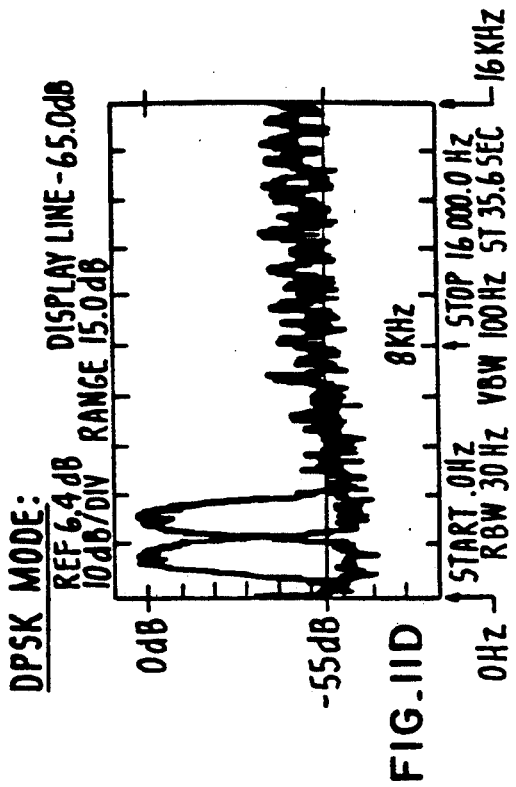
FIG._IID
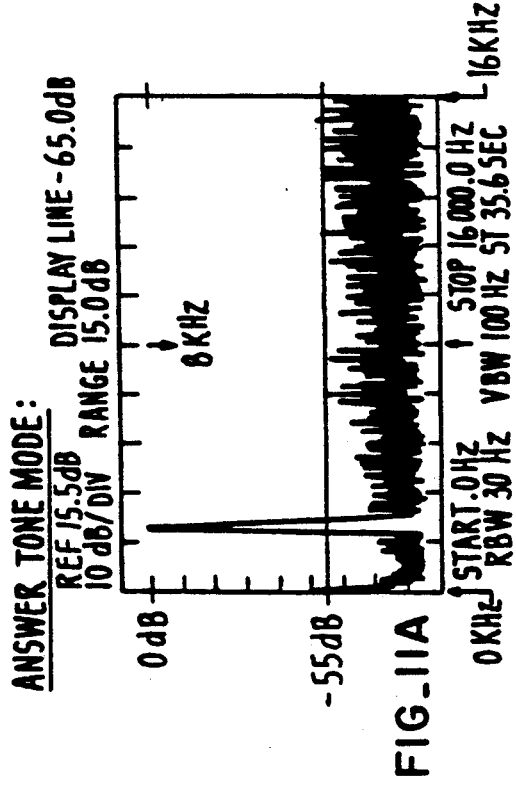
FIG._IIA
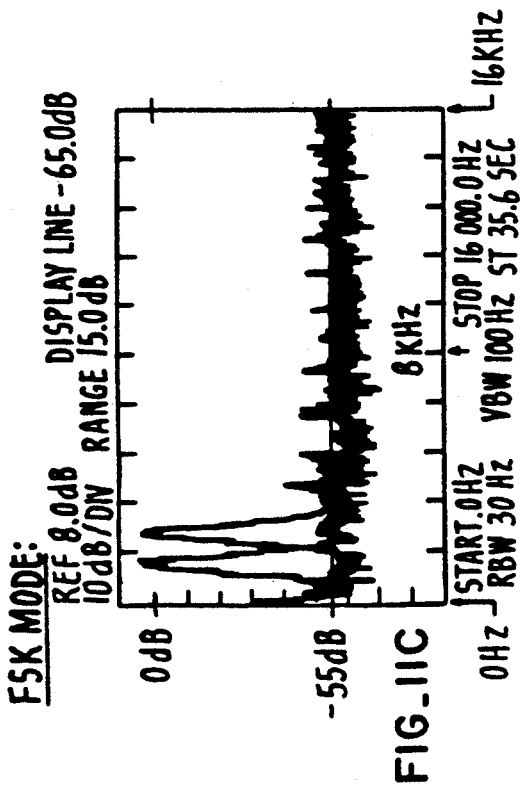
FIG._IIC

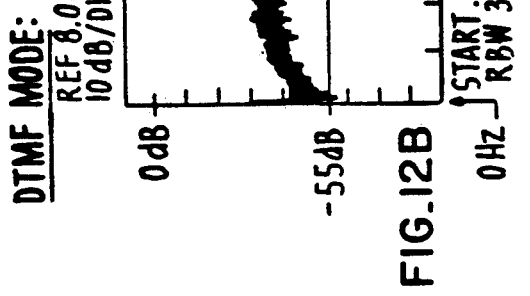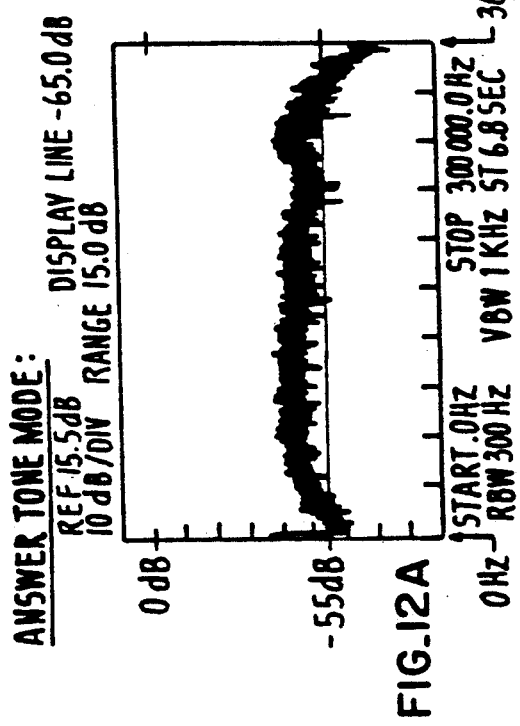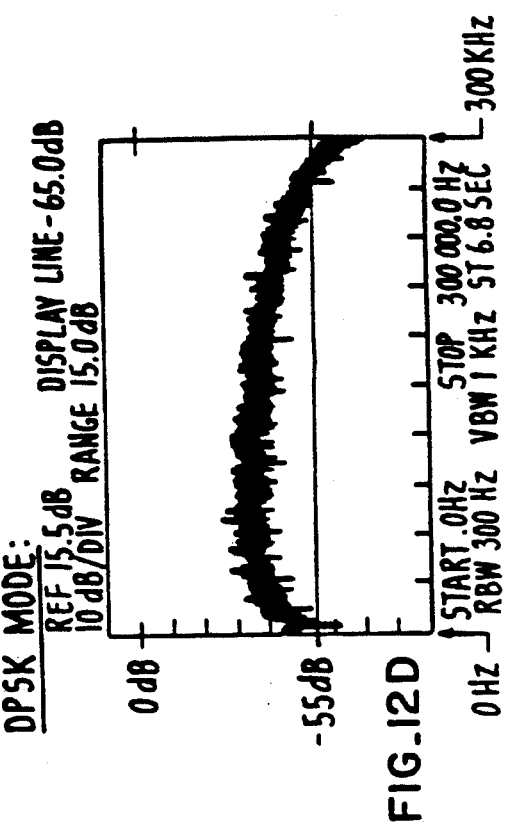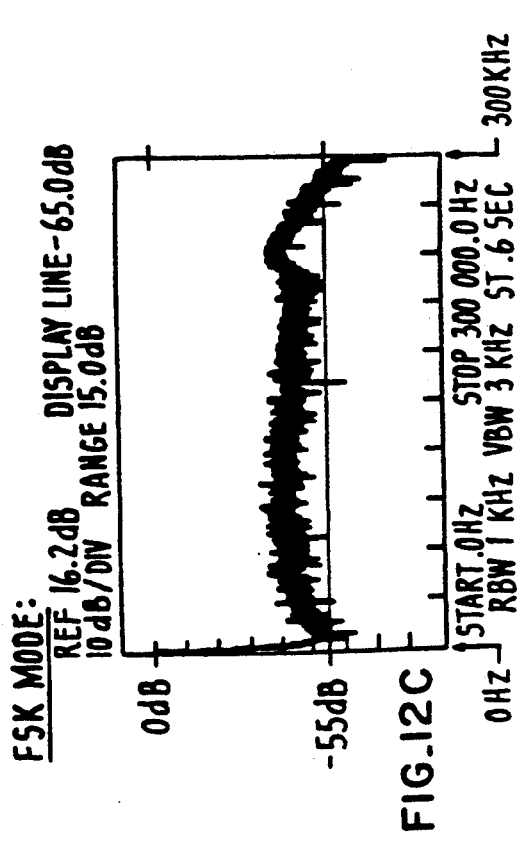

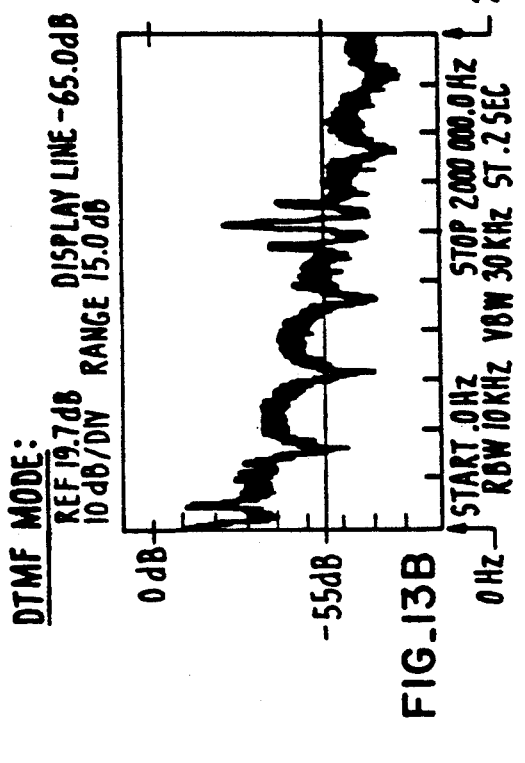
FIG._13B
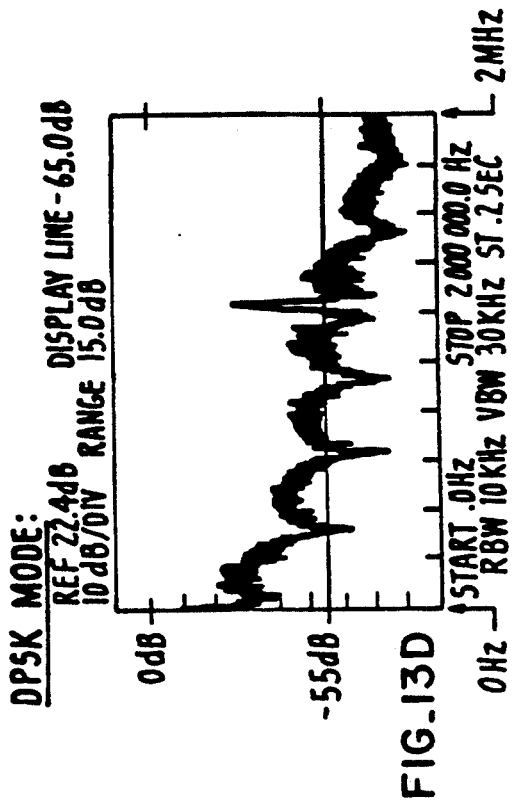
FIG._13D
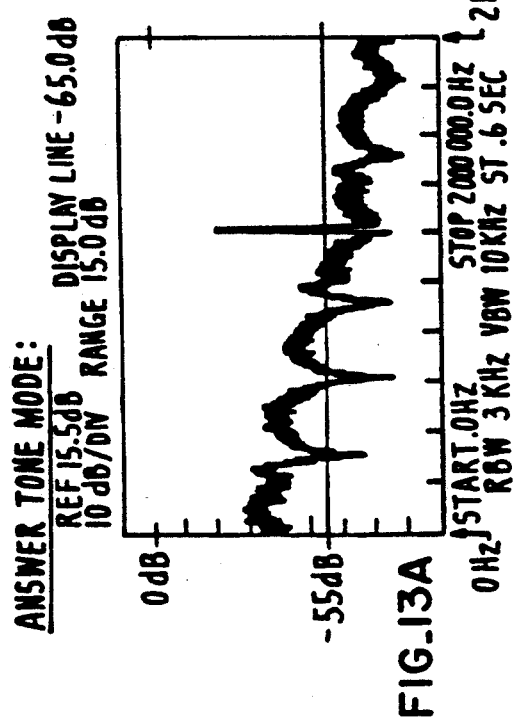
FIG._13A
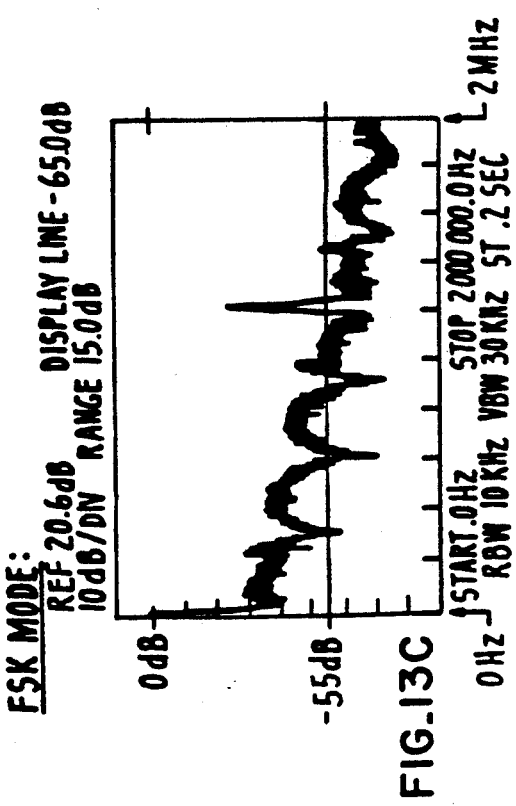
FIG._13C

FREQUENCY SHIFT KEYING MODULATOR

This is a divisional of application Ser. No. 021,918, filed Mar. 4, 1987, now U.S. Pat. No. 5,027,372, issued Jun. 25, 1991.

MICROFICHE APPENDICES

Microfiche Appendices A-G, comprising one microfiche of 31 frames, are included as part of this patent document.

BACKGROUND OF THE INVENTION

1. Field of the Invention

The present invention relates to electrical communications systems and, in particular, to a frequency shift keying (FSK) modulator.

2. Discussion of the Prior Art

The basic function of a communications system is to transmit information from a source to a destination as fast and as accurately as possible. The source and the destination are physically separated from one another and are connected by a communications channel.

There are two types of information sources: analog information sources and discrete information sources. Analog sources, such as a microphone, produce a continuous signal. Discrete sources, such as a digital computer, generate a signal consisting of a sequence of pulses. Analog signals can be converted to discrete signals by utilizing sampling and quantizing techniques.

Communications channels which are designed to handle voice transmissions (i.e., the telephone network) have characteristics which make it difficult for them to transmit digital signals. To permit the transmission of digital bit streams over a voice channel, it is necessary to utilize the digital data pulses to modulate a carrier waveform having a frequency which is compatible with the voice channel.

The equipment which performs the required modulation is generally referred to as a "modem". The term "modem" is an acronym for Modulator-DEModulator, since the equipment typically includes the capability not only to modulate transmitted signals but also to demodulate received signals.

Generally speaking, as stated above, a modulator receives a serial digital data bit stream from an information source and converts the bit stream to a waveform suitable for transmission over the communication channel. In addition to matching the frequency spectrum of the transmitted signal with the characteristics of the communication channel, the modulator also minimizes the effect of signal distortion caused by the non-ideal nature of the communications channel.

There are three basic modulation types: (1) amplitude-shift keying (ASK), (2) frequency-shift keying (FSK), and (3) phase-shift keying (PSK).

Data transmission systems which operate at lower data rates, i.e. 1200 baud or less, typically utilize FSK modulation. In FSK modulation, the two binary states are represented by two different frequencies and are detected by using two frequency tuned sections, one tuned to each of the two bit frequencies. The demodulated signals are then integrated over the duration of a bit and a binary decision is based on the result.

The FSK modulator section of the circuit of the present invention utilizes a spectrum controller which, during each data transition, sends out six intermediate frequencies to smooth the frequency changeover.

Thus, the present invention provides a frequency phase shift keying modulator which generates a strobing signal in response to transitions in the serial digital data input signal. A digital rate generator responds to the strobing signal by providing an output representative of a destination frequency. The carrier waveform is then generated utilizing the output of the rate generator to provide the frequency modulated output signal.

A better understanding of the features and advantages of the present invention will be obtained by reference to the following detailed description of the invention and accompanying drawings, which set forth an illustrative embodiment in which the principles of the invention are utilized.

DESCRIPTION OF THE DRAWINGS

FIGS. 1A-1H combine to provide a schematic diagram illustrating a modulator/generator circuit in accordance with the present invention.

FIG. 3 is a graph illustrating the out-of-band amplitude/frequency response curve of the circuit shown in FIGS. 1A-1H.

FIG. 4 is a graph illustrating the in-band amplitude/frequency response curve of the circuit shown in FIGS. 1A-1H.

FIGS. 6A and 6B are performance displays illustrating adjacent channel rejection for 1200 Hz DPSK mode and 300 Hz FSK mode operation, respectively, of the circuit shown in FIGS. 1A-1H.

FIGS. 7A and 7B are performance displays illustrating low band and high band DPSK in-band frequency response, respectively, of the circuit shown in FIGS. 1A-1H.

FIGS. 9A and 9B are performance displays illustrating tone purity for the DPSK Lo-band carrier and the DPSK Hi-band carrier, respectively, of the circuit shown in FIGS. 1A-1H.

FIGS. 10A and 10B are performance displays illustrating answer tone purity at 2100 Hz and 2225 Hz, respectively, for the circuit shown in FIGS. 1A-1H.

FIGS. 11A-11D are performance displays illustrating 0-16 KHz out-of-band rejection for answer tone mode, DTMF mode, FSK mode and DPSK mode operation, respectively, of the circuit shown in FIGS. 1A-1H.

FIGS. 12A-12D are performance displays illustrating 0-300 KHz out-of-band rejection for answer tone mode, DTMF mode, FSK mode and DPSK mode operation, respectively, of the circuit shown in FIGS. 1A-1H.

FIGS. 13A-13D are performance displays illustrating 0-2 MHz out-of-band rejection for answer tone mode, DTMF mode, FSK mode and DPSK mode operation, respectively, of the circuit shown in FIGS. 1A-1H.

DETAILED DESCRIPTION OF THE PREFERRED EMBODIMENT

The present invention is directed to a modulator/generator circuit for use in modem applications, and having particular use in Bell-212A or V.22 modems.

The circuit of the present invention integrates the following functions:
1. a 1200 baud 4-phase differential phase shift keying (DPSK) modulator;
2. a 300 baud frequency shift keying (FSK) modulator;
3. a dual tone multi-frequency (DTMF) generator; and
4. 2100 and 2225 Hz answer tone generators.

A complete schematic diagram of a modulator/generator circuit in accordance with the present invention is shown in the combination of FIGS. 1A–1H.

The 4-phase DPSK section of the circuit receives a dibit input signal and generates a low harmonics (more than 60 dB rejection) modulated output. The in-band frequency shaping and delay characteristics of the DPSK section are all programmable through the use of Read-Only-Memories (ROM). Therefore, the results are both predictable and integratable.

The DPSK modulator, described in detail below, utilizes time-domain filtering to meet the above-stated requirements of the Bell-212A or V.22 modem specification. First, the step response characteristic of the system is computed. These results are then used to code two ROMs which perform the key functions of the system, "phase envelope generation" and "carrier insertion/vector summing", respectively. Additional circuitry is provided to complete the digital portion of the DPSK modulator. The output of the digital portion of the DPSK modulator is available as an eight-bit code which drives a digital-to-analog converter, or DAC, for waveform synthesis.

Anti-alias frequencies are removed by a simple analog low-pass filter placed after the DAC. A 3 dB cut-off frequency is designed such that the in-band frequency/phase characteristic of the DPSK modulator is not affected by this filter.

Figure 1G:
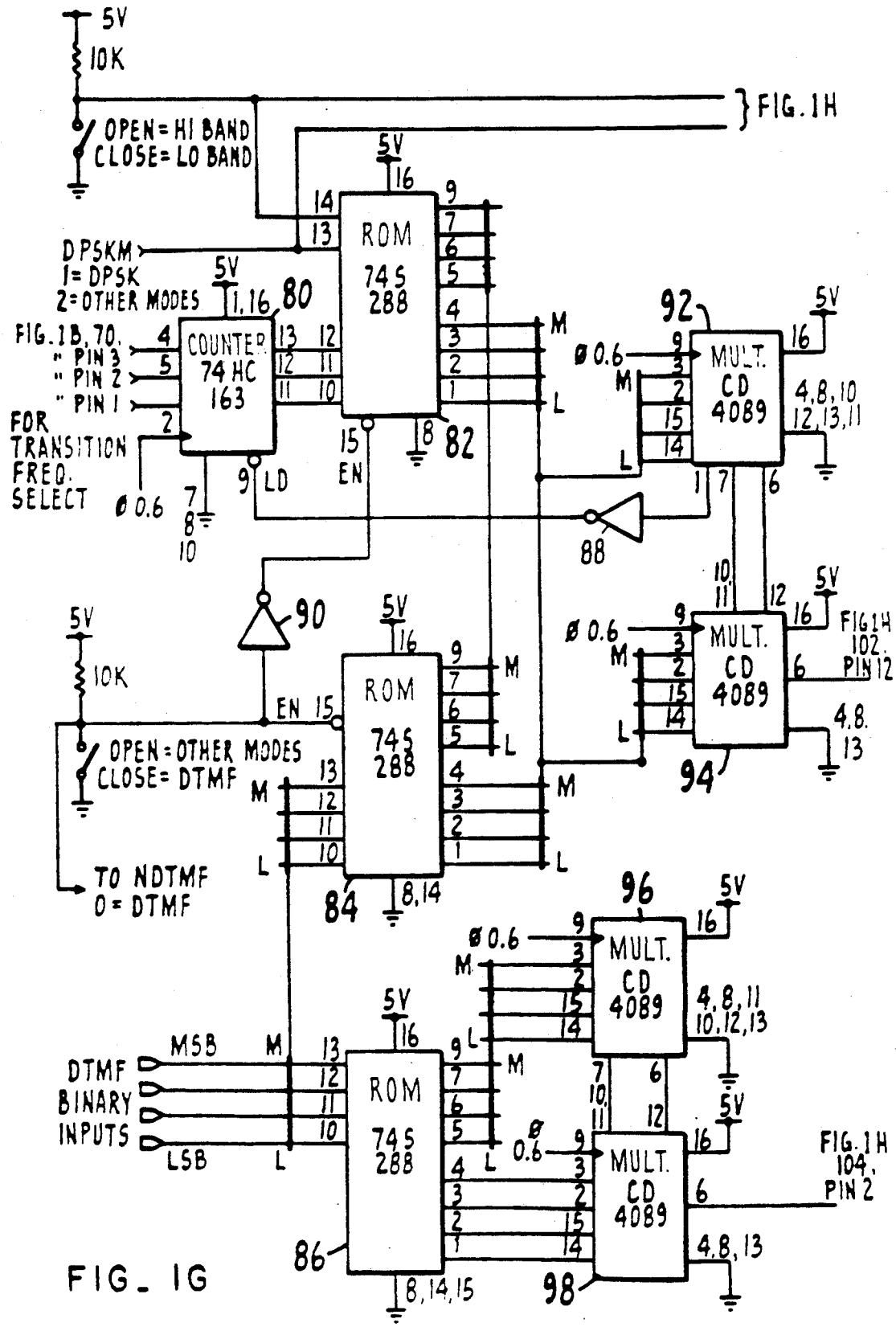
Figure 1H:
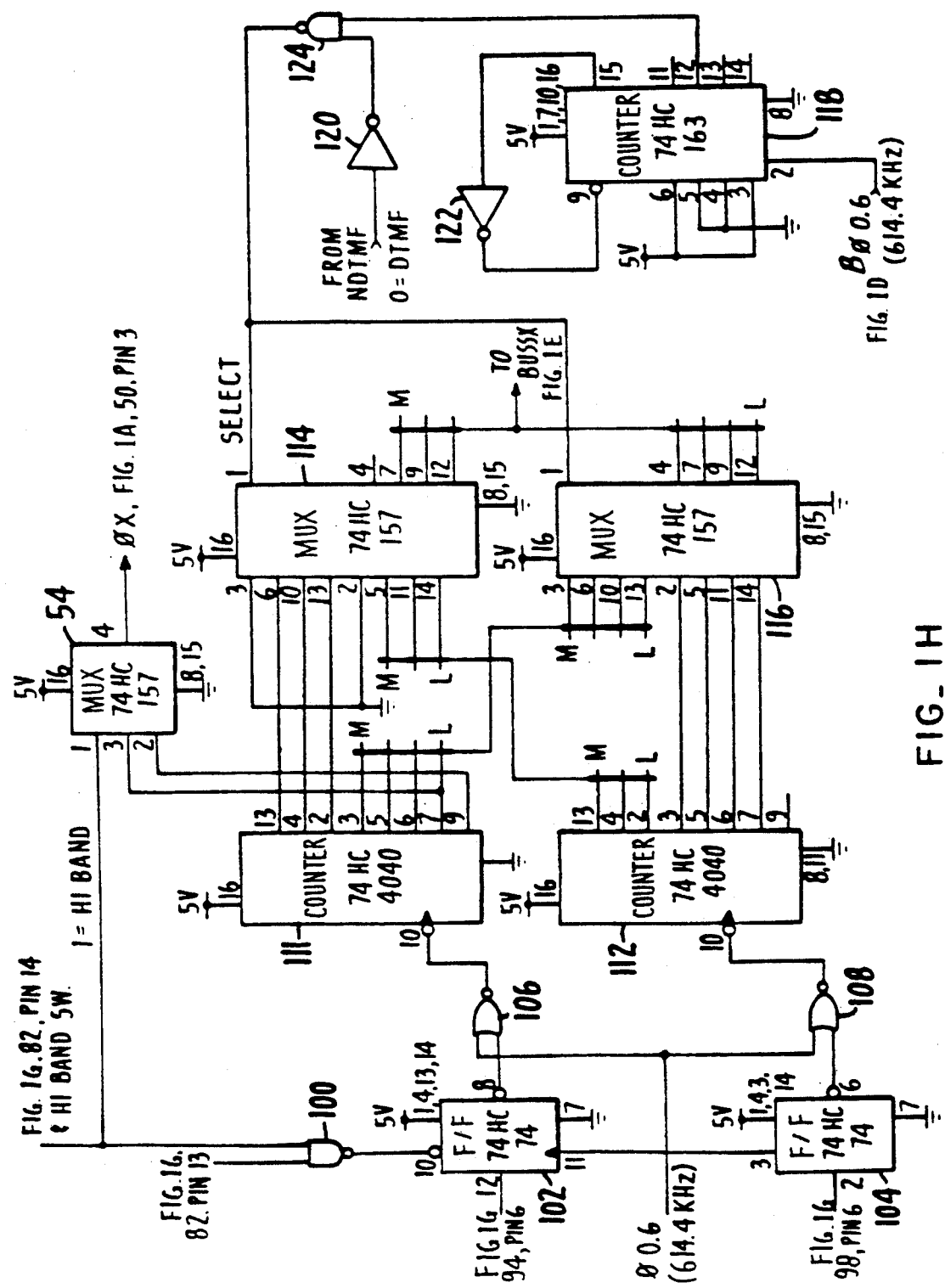
Figure 2:
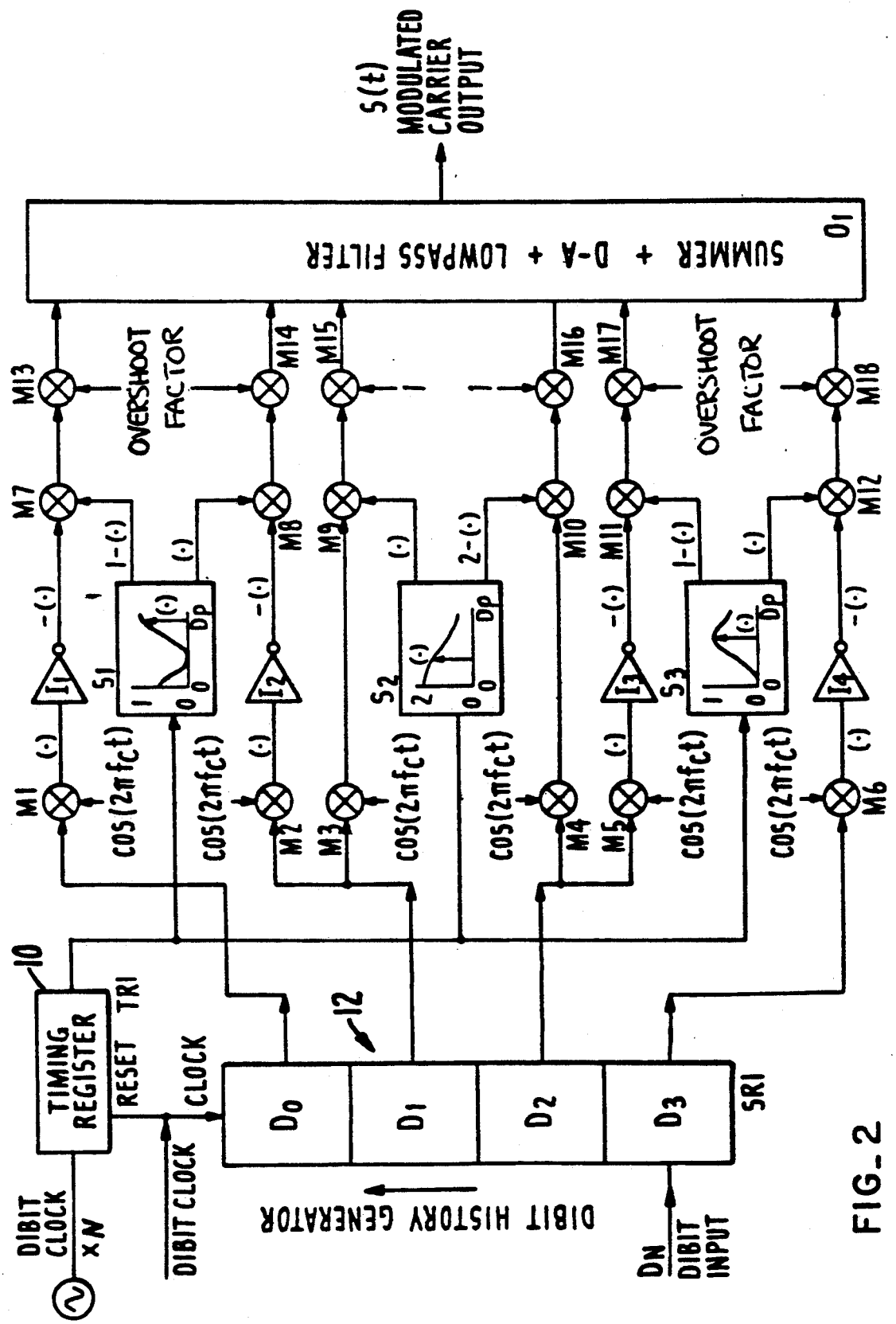
FIG. 2 is a schematic block diagram illustrating a model of a DPSK modulator section of a circuit in accordance with the present invention.
Figure 5:
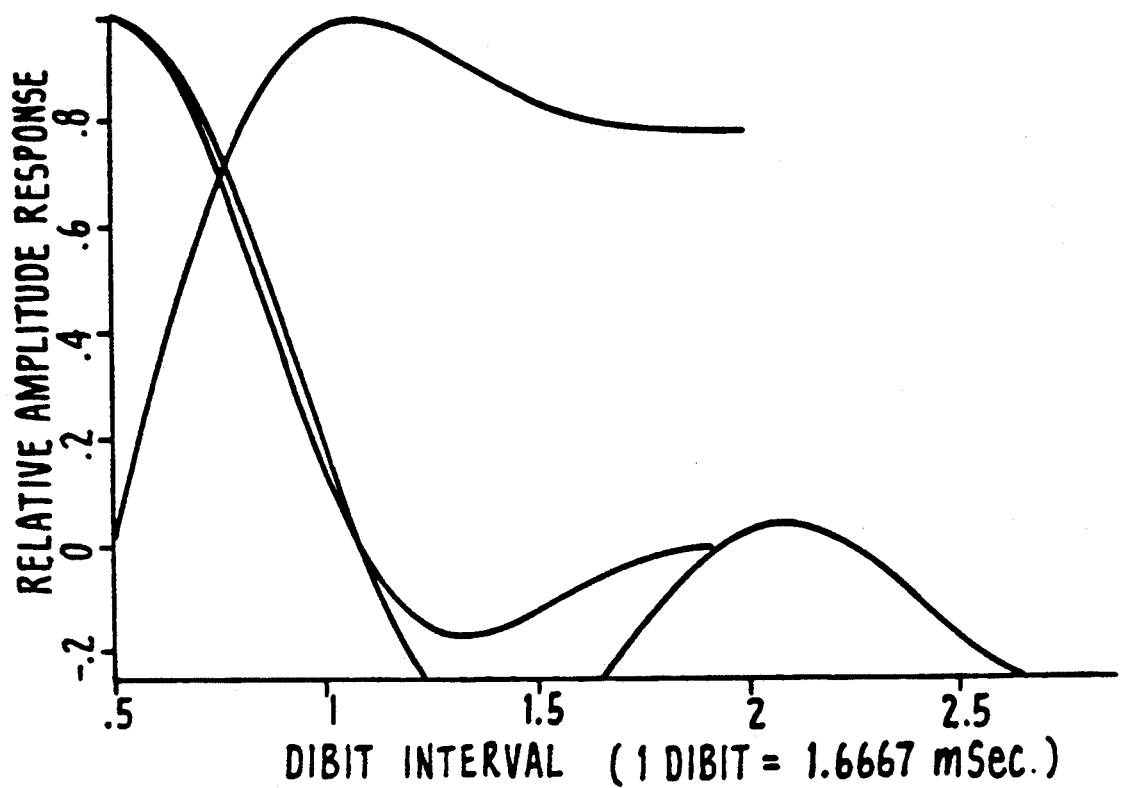
FIG. 5 is a graph illustrating both the impulse response and the step response of the circuit shown in FIGS. 1A-1H.
Figure 8B:
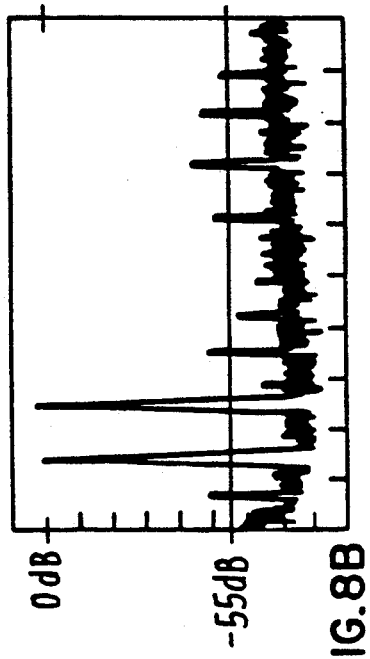
FIGS. 8A-8P are performance displays illustrating the DTMF generator output spectrum of the circuit shown in FIGS. 1A-1H.
Figure 8D:
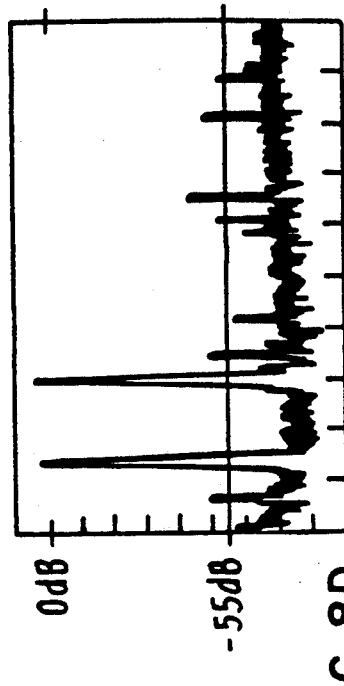
Figure 8A:
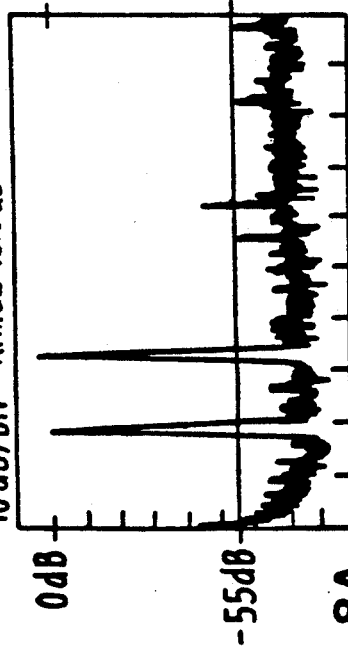
Figure 8C:
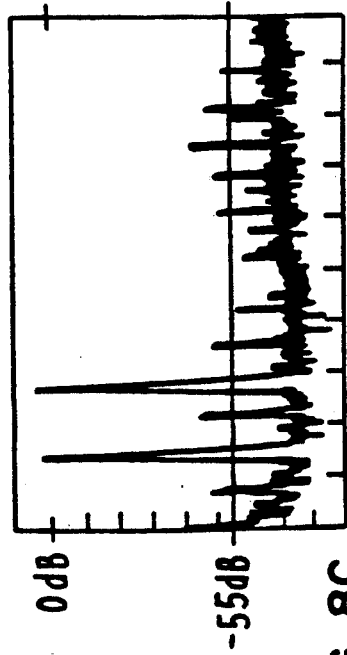

FIG. 2 provides a model of the DPSK modulator portion of the circuit shown in FIGS. 1A–1H.

A timing register 10 is used to provide synchronization for the three envelope signals to the dibit clock.

An incoming dibit signal $D_n$ is shifted into a dibit history generator 12 at each dibit interval. The four sets of outputs, i.e. D3, D2, D1 and D0, represent the binary weighted values of the consecutive dibits. These values are ranged from 0 to 3 because the system is a 4-phase modulator. The direction of shifting is from D3 to D0, i.e., the most recent value is depicted by D3. The four dibit outputs D3–D0 are connected to six multipliers M1–M6 to perform phase modulation. The general output equation for these six multipliers is $$mx(t) = \cos(2*pi*fc*t + Ip + Dx*pi/2) \quad (1)$$

where "x" denotes the order of the multipliers and "Dx" is the general case for D0, D1, D2 and D3. The remaining terms are defined below. Inverters I1–I4 invert the sign of the m1(t), m2(t), −m5(t) and m6(t) vectors. Vectors −m1(t), −m2(t), m3(t), m4(t), −m5(t) and −m6(t) are then individually routed to six density function modulators M7–M12, respectively. The modulators also receive input from the three envelope generators S1, S2 and S3. Following these modulators M7–M12, the signals are scaled according to the breakdowns of a step response, which is described below.

The last step is to process the six resulting vectors in a combination summer/DAC/low-pass filter to form the modulated carrier output s(t).

A system equation can be derived based on the FIG. 2 model. The output s(t) of the DPSK modulator is thus given by $$S(t) = - \quad (2)$$
$$\{0.13 * [1 - S1(t/Dp - t|Dp)] * [\cos(2*pi*fc*t + Ip + D0*pi/2)]$$
$$-$$
$$\{0.13 * [\quad S1(t/Dp - t|Dp)] * [\cos(2*pi*fc*t + Ip + D1*pi/2)]$$
$$+$$
$$\{1 \quad * [\quad S2(t/Dp - t|Dp)] * [\cos(2*pi*fc*t + Ip + D1*pi/2)]$$
$$+$$
$$\{1 \quad * [2 - S2(t/Dp - t|Dp)] * [\cos(2*pi*fc*t + Ip + D2*pi/2)]$$
$$-$$
$$\{0.13 * [1 - S3(t/Dp - t|Dp)] * [\cos(2*pi*fc*t + Ip + D2*pi/2)]$$
$$-$$
$$\{0.13 * [\quad S3(t/Dp - t|Dp)] * [\cos(2*pi*fc*t + Ip + D3*pi/2)]$$

where
- of is the response overshoot factor (calculated from program TXRESP.SRC which is provided as microfiche Appendix A at the end of this specification);
- t is the instant that s(t) is computed;
- Dp is the dibit period;
- "*" denotes floating point multiplication;
- "/" denotes floating point division;
- " " denotes integer division;
- pi = 3.1416;
- fc is the frequency of the unmodulated carrier;
- Ip is the initial phase of the carrier.
- D0, D1, D2, D3 are binary weighted values of the dibits in the dibit history generator.
- S1, S3 have a weighted value of 0 to 1, which are the density functions of the "tail" segments of the step response curve.
- S2 has a weighted value of 0 to 2, the density function of the middle portion of the step response.

Referring to FIGS. 1A–1H, and particularly to FIG. 1A, "D" type flip-flop ICs 20, 22, 24, and 26 and three XOR gates 28, 30, and 32 combine to form a self-synchronizing 17-bit data scrambler. A serial digital data input stream from an information source is applied to pin 3 of flip-flop 20. Two outputs, representing the dibit value of the serial input sequence, are available at pins 4 and 13 of flip-flop 22. These dibit outputs are then fed to pins 3 and 4 of "D" flip-flop IC 34 (FIG. 1B). Flip-flop 34 forms part of a differential encoder, which is described in detail below.

As shown in FIG. 1A, two counters 36 and 38 form a 64 consecutive 1's detector. The function of the consecutive 1's detector is to prevent occasional lockup of the data scrambler by inverting the next data input to the scrambler if the detection condition is met.

A switch 39 connected to pin 9 of counter 38 is used to disable the data scrambler during handshaking or in non-DPSK modes.

When in the DPSK mode, the circuit is clocked at a 1200 Hz data rate.

When in the FSK mode, data transition detection is performed by sharing flip-flops 20, 22 and 24 and XOR gates 28 and 30, as described below, and the rest of the scrambler circuit is set to idle by pulling pin 9 of counter 38 low by closing switch 39. In this case, pins 12, 13 and 14 of multiplexer 42 (FIG. 1B) select 307.2 KHz as the clocking frequency to the scrambler.

As stated above, pins 4 & 13 of flip-flop 22 provide the inputs to a differential encoder which includes flip-flop 34 and ROM 44 (FIG. 1B). The outputs of the differential encoder are available at pins 11 & 12 of flip-flop 34.

ROM 44 is a 32×2 bit ROM which contains the codes for performing the differential encoding. The source listing of coding program "TXD.SRC" of ROM 44 is provided as microfiche Appendix B at the end of this specification. A select input is available at pin 3 of ROM 44. A low level at this pin selects the low speed mode (600 baud); a high level sets the encoder back to the normal mode (1200 baud). The two different modes are selected by opening or closing switch 40.

When in the non-DPSK modes, i.e., FSK, DTMF and answer tone modes, the encoder outputs are set to logical zero by grounding pin 1 of flip-flop 34 through switch 46.

Flip-flop 22 and XOR gates 28 and 30, shown in FIG. 1A, and XOR gate 48, shown in FIG. 1B, combine to form an FSK data transition pulse generator. When operating in the FSK mode, the signal developed at pin 13 of flip-flop 22 is delayed by one clock period (307.2 KHz) referenced to pin 4 of flip-flop 22. These two signals are then provided as the inputs to XOR gate 48. Thus, when there is a transition at the data input, a strobing pulse is generated at the output of XOR gate 48. These strobing pulses are used to synchronize an envelope generator, which is described below.

Flip-flop 50 and multiplexer 52, shown in FIG. 1A, and multiplexer 54, shown in FIG. 1H, combine to form a dibit re-synchronizer and multiplexer. The data rate is asynchronous to the carrier frequency in the DPSK mode as well as in the FSK mode. In order to prevent spurious interferences, resync flip/flop 50 is provided to align the dibit clock edges to the carrier clock. The re-synchronizing clock to flip/flop 50 is provided by multiplexer 54 which selects one of the high-frequency carrier clocks from sine-wave counter 111. The selection is determined by the state of the hi/lo band switch input.

The re-synchronized dibit clock and the FSK transition strobing signal are then applied to multiplexer 42. The output of multiplexer 42 is connected to one of the two inputs under the control of the DPSK mode select input (pin 1).

As shown in FIGS. 1B–C, the output of multiplexer 42 is then routed to an envelope generator formed by flip-flop 56, three NOR gates 58, 60 and 62, envelope counter 64, ROM 66, counter 68, ROM 70, flip-flop 72, ROM 74 and flip-flop 76.

Flip-flop 56, the three NOR gates 58, 60, 62, and envelope counter 64 combine to form a state counter. The counter state is synchronized to either the resync dibit clock (DPSK mode) or the FSK data transition strobing signal (FSK mode). The counter starts from the "0th" state when initiated by the aforementioned signals and counts up to the "1023th" state if there is no early-synchronizing pulse. If there is an early-synchronizing pulse, the counter is forced to the "0th" state. After the reset, the counter repeats the counting sequence. If there is a late synchronizing pulse, the counter stays at the "1023th" count until the next pulse appears. In the DPSK mode, the early/late pulses are caused by the asynchronous data/carrier clocks. In the FSK mode, the pulses result from the asynchronization and from missing transitions in the data input sequence.

ROM 66 is a 1024×4 bit ROM. It decodes the counter states and develops four output signals: D0 (pin 14), D1 (pin 13), D2 (pin 12), and D3 (pin 11).

The time function of the D0 output represents the density function of the middle portion of the DPSK modulator step response. It is Sigma-Delta encoded with 1024-bit resolution in a dibit period.

The coding of the D1 output multiplexes the density functions of the two tail portions of the step response in an alternating manner. Each portion has 512-bit resolution in a dibit period. The demultiplexing control signal is taken from pin 9 of envelope counter 64. This arrangement simplifies the design of the phase modulator.

The D2 output is used to hold the state counter when there is a late synchronizing pulse.

The D3 output is used for controlling the FSK modulator spectrum. It enables 3-bit counter 68 to count up at predefined intervals after each data input transition. The predefined intervals are calculated based on a raised-cosine transition. The program listing "RGCR.SRC/DTMFL.SRC/DTMFH.SRC" for the raised-cosine transition function is provided in microfiche Appendix C at the end of this specification.

During the FSK mode, 3-bit counter 68 is reset to zero after each data transition. This is accomplished by a clearing signal fed from pin 14 of flip-flop 56. After the reset, the enable signal from pin 11 of ROM 66 allows the counter to count up at pre-defined intervals. Once the counter hits the maximum count, it will remain at this state until the sequence is reinitiated by the next data transition. The outputs of the counter are then used to address frequency look-up codes stored in look-up ROM 70.

Before the look-up process, ROM 70 senses the polarity of the data input signal via the connection between pin 3 of flip-flop 24 and pin 13 of ROM 70 to determine the proper frequency stepping direction. On every input data transition, the circuit steps through six intermediate frequencies before it hits the destination frequency.

Since the answer tone frequencies are embedded in the FSK frequencies, the pin 14 input of ROM 70 is assigned to address these frequencies when the circuit operates in the answer tone mode. In this case, the data input on pin 13 of ROM 70 is used to select one of the two answer tones while the outputs from the counter 68 are ignored. The program "ATNE.SRC" used to code ROM 70 is provided as microfiche Appendix D.

On the DPSK side, the three envelope outputs, i.e. pins 5, 13 and 14 of ROM 66, are fed to a data switching ROM 74, as shown in FIG. 1C. Data switching ROM 74 also receives an array of signals from flip-flop 72 which shows the phase history of the input dibit signal. Data switching ROM 74 then multiplexes all of the input signals to form two sets of outputs. The first set, i.e. pins 13 and 14 of ROM 74, is assigned to the phase envelope generation of the middle portion of the system step response. The second set, i.e. pins 11 and 12 of ROM 74, is used for the two tail portions. Each set is 2 bits wide and its binary weighting represents one of the four carrier phases. These four outputs ar Ⓡrouted to ROM 78 (FIG. 1E) via pipeline flip-flop 76. The program "DSR.SRC" for coding data switching ROM 74 is provided in microfiche Appendix E.

Referring to FIGS. 1G–1H, counter 80, code converter 82, 84 and 86, inverters 88 and 90, rate multipliers 92,94 and 96,98, NAND gate 100, flip-flops 102 and 104 and NOR gates 106 and 108 combine to form a dual frequency generator. The tone/carrier frequency generation is based on a 614.4 KHz clock source and the multiplying function of a rate multiplier.

There are two almost identical generator circuits employed in the system. Code converter ROMs 82 and 84, rate multiplier 92,94, flip-flop 102 and NOR gate 106 form the first generator, which is responsible for generating the DPSK/FSK carrier frequencies, the answer tones and the low-band DTMF tones. The second generator consists of ROM 86, rate multiplier 96,98, flip-flop 104 and NOR gate 108 and is responsible for generating the high-band DTMF tone. The frequency generated is a fractional quantity of the input frequency. The fractional quantity is the result of the coding applied to the rate multiplier over the repeating sequence of the rate multiplier. In the case of the illustrated circuit configuration, a simplified equation can be written as follows:

$$\text{Frequency out (KHz)} = 614.4 * \text{input code}/256 \quad (3)$$

Code converter 82 is used to set up the frequency select codes to the first rate multiplier when the circuit operates in the FSK/DPSK/Answer Tone modes. Gated "D" type flip-flop 80 is used for synchronous loading of the FSK transition frequency select outputs from look-up ROM 70 into code converter 82. During the DTMF mode, code converter 82 is in the tri-state mode and a DTMF code converter 84 is enabled for the low-band frequency generation. Code converter 86 is the high-band DTMF converter for the second frequency generator.

During the DPSK high-band mode, the generator is defeated by pulling pin 10 of flip-flop 102 low. The output frequency measured at the output of NOR gate 106 is the same as the input frequency, which is 614.4 KHz.

The outputs of the two frequency generators are available at the outputs of NOR gates 106 and 108, respectively. A summary showing the accuracies of the frequencies synthesized is provided in Table 1 below.

TABLE 1

| | FREQUENCY DEVIATIONS | | | | |
|---|---|---|---|---|---|
| NO. | FREQ | FREQ GEN | DELTA F | ERR % | CNTL NUM |
| DPSK: | | | | | |
| 0 | 1200.0000 | 1200.0000 | 0.0000 | 0.00 | 128 |
| FSK: | | | | | |
| 1 | 1070.0000 | 1068.7500 | 1.2500 | −.12 | 114 |
| 2 | 1079.1175 | 1078.1250 | .9925 | −.09 | 115 |
| 3 | 1105.0800 | 1106.2500 | −1.1700 | .11 | 118 |
| 4 | 1143.7043 | 1143.7500 | −.0457 | .00 | 122 |
| 5 | 1188.1568 | 1190.6250 | −2.4682 | .21 | 127 |
| 6 | 1229.6848 | 1228.1250 | 1.5598 | −.13 | 131 |
| 7 | 1259.2698 | 1256.2500 | 3.0198 | −.24 | 134 |
| 8 | 1270.0000 | 1265.6250 | 4.3750 | −.34 | 135 |
| FSK / | Answer tones: | | | | |
| 9 | 2025.0000 | 2025.0000 | 0.0000 | 0.00 | 216 |
| 10 | 2034.4661 | 2034.3750 | .0911 | −.00 | 217 |
| 11 | 2061.2259 | 2062.5000 | −1.2741 | .06 | 220 |
| 12 | 2100.5180 | 2100.0000 | .5180 | −.02 | 224 |
| 13 | 2145.0066 | 2146.8750 | −1.8684 | .09 | 229 |
| 14 | 2185.8957 | 2184.3750 | 1.5207 | −.07 | 233 |
| 15 | 2214.6474 | 2212.5000 | 2.1474 | −.10 | 236 |
| 16 | 2225.0000 | 2221.8750 | 3.1250 | −.14 | 237 |
| DTMF: | | | | | |
| 17 | 697.0000 | 693.7500 | 3.2500 | −.47 | 74 |
| 18 | 770.0000 | 768.7500 | 1.2500 | −.16 | 82 |
| 19 | 852.0000 | 853.1250 | −1.1250 | .13 | 91 |
| 20 | 941.0000 | 937.5000 | 3.5000 | −.37 | 100 |

TABLE 1-continued

| | FREQUENCY DEVIATIONS | | | | |
|---|---|---|---|---|---|
| NO. | FREQ | FREQ GEN | DELTA F | ERR % | CNTL NUM |
| 21 | 1209.0000 | 1209.3750 | −.3750 | .03 | 129 |
| 22 | 1336.0000 | 1340.6250 | −4.6250 | .35 | 143 |
| 23 | 1477.0000 | 1481.2500 | −4.2500 | .29 | 158 |
| 24 | 1633.0000 | 1631.2500 | 1.7500 | −.11 | 174 |

As shown in FIG. 1H, a sine-wave counter and multiplexer is formed by sine-wave counters 111 and 112, multiplexers 114 and 116, counter 118, inverters 120 and 122, and NAND gate 124. The two clock outputs from the dual frequency generator are fed to two 8-bit sine-wave counters 111 and 112, respectively. The outputs of these two counters are then multiplexed to form one set of outputs such that the select input, i.e. pin 1 of multiplexer 114 and pin 1 of multiplexer 116, determines the "on" time for each counter. During the non-DTMF modes, the first counter 111 is always on and the outputs from the second counter 112 are ignored. During the DTMF mode, the circuit formed by counter 118, inverter 122 and NAND gate 124 is activated and a select signal with a 3 to 4 duty cycle ratio is applied to the select pins. The difference in duty cycle provides an amplitude blending ratio such that the amplitude of the high-band frequencies is boosted by 2.5 dB referenced to the low band frequencies.

Referring to FIG. 1E, ROM 78, sine-wave look-up ROM 126 and flip-flop 128 form a phase modulator and sine-wave look-up ROM. The five low order output bits from the sine wave counter/multiplexer, i.e. pin 12 of multiplexer 114 and pins 4, 7, 9 and 12 of multiplexer 116 are fed to the five low-order bits of sine-wave look-up ROM 126. These signals signify the phase angle location of a sine-wave within a quadrant. The two high-order bits from pins 7, 9 of multiplexer 114 are connected to phase-adder ROM 78 which is a dual 2-bit adder. The adder circuit modulates the two sets of phase outputs from the envelope generator with the phase of the carrier generated by sine-wave counter 111.

Look-up ROM 126 contains a sine-wave look-up table plus a vector summer. The vector generated by the phase inputs at pins 19 and 18 of ROM 126 is scaled down and subtracted from the vector generated by the signals at pins 17 and 16. The source listings "MEG.SRC/CSM.SRC" and "PADD.SRC" for the coding algorithm for look-up ROM 126 and phase-adder ROM 78, respectively, are provided at microfiche Appendices F and G, respectively.

During the non-DPSK modes, the two sets of phase inputs are inactive due to the effect of the clearing signal applied to "D" flip-flop 34. Adder 78 then becomes a "fall-through" type of buffer, and the output from look-up ROM 126 is simply an unmodulated sine-wave. Flip-flop 128 is added for pipelining the outputs into the next section of the circuit, a digital-to-analog converter (DAC) formed by adders 130 and 132 and flip-flop 134.

The parallel outputs from phase modulator look-up ROM 126 are converted to a digital bit stream at pin 9 of adder 130. A simple low-pass filter, such as an RC network, may be utilized to convert the digital bit stream to an analog signal. Since this digital circuit is a direct drop-in replacement for a conventional analog DAC (the RC filter could be treated as the antialias filter), the circuit is termed the "Digital-DAC" although it sends out a digital signal rather than the analog counterpart.

The entire DAC circuit is basically an accumulator with the carry bit connected as the DAC output. The underlying theory is that the circuit performs as a real time Sigma-Delta encoder; the adding function of the accumulator does the "Sigma" portion of the incoming parallel data while the carry output performs the "Delta" function on accumulator overflow. Once the accumulator overflows, a logical "1" is generated at the carry output and an amount equal to the carry weighting is subtracted from the accumulator.

Due to the spreaded spectrum characteristic of the switching waveform, it is desirable to place a lowpass filter after this block to remove the unwanted high frequency components.

Referring to FIG. 1F, shift register 136, NOR gates 138, 140, 142 and 144 and voltage buffer 146 form a notch insertor. In order to remove the high frequency components economically, a switched-capacitor lowpass filter is considered a primary choice to replace the RC filter. The notch insertor circuit interfaces the digital DAC output to a switched-capacitor filter such that frequency notches are inserted at all multiples of the sampling frequency of the switched-capacitor filter. The insertion of frequency notches eliminates the alias frequency foldback problem.

Shift-register 136 and the RC network form a 4-tap FIR filter. A sinx/x filter characteristic is achieved by choosing equal values for the four associated resistors 150, 152, 154, 156. In this case, the weighting function is rectangular and frequency notches appear at all multiples of 307.2 KHz. A capacitor 158 placed after the resistors provides a 3 dB roll-off frequency at about 64 KHz. This prevents a slewing problem from appearing in circuits placed after this block; high frequency component rejection is not the primary design concern.

The NOR gates 138, 140, 142 and 144 are added to eliminate the effects of the asymmetrical drive characteristic of shift register 136. The output signals from shift register 136 are gated with a 1.2288 MHz clock before the filter-tap summing point, so a better even-harmonic rejection can be achieved. Component 146 is simply a voltage buffer for driving purpose.

The design of the switched-capacitor filter as well as other blocks placed after the filter are not essential to an understanding of the present invention. Therefore, detailed description of these conventional elements are not provided.

It should be noted that all of the performance displays, i.e., FIGS. 6A-B, 7A-B, 8A-P, 9A-B, 10A-B, 11A-D, 12A-D and 13A-D, of the modulator/generator are taken at the output of voltage buffer 146.

The following Table 2 lists the nine ROMs used in the above-described circuit together with their corresponding program names; the program listings are provided in the microfiche Appendices

TABLE 2

| APPENDIX | PROGRAM NAME | ROM |
|---|---|---|
| A | TXRESP.SRC | |
| B | TXD.SRC | 44 |
| C | RGCR.SRC | 82 |
|   | DTMFL.SRC | 84 |
|   | DTMFH.SRC | 86 |
| D | ATNE.SRC | 70 |
| E | DSR.SRC | 74 |

TABLE 2-continued

| APPENDIX | PROGRAM NAME | ROM |
|---|---|---|
| F | MEG.SRC | 66 |
|   | CSM.SRC | 126 |
| G | PADD.SRC | 78 |

All of the above-identified programs are selfcontained except "MEG/CSM.SRC". This program requires an input data file "STEP.BDAT". The input data file contains the system step response information which is generated by the "TXRESP.SRC" program provided in microfiche Appendix A.

The "TXRESP.SRC" program performs a Discrete Inverse-Fourier Transform (DIFT) function and utilizes a "frequency sampling" method on input frequency data. A modified "Kaiser" window is then applied to the time function to achieve a truncated 3-dibit interval impulse/step response.

Microfiche Appendices A-G are hereby incorporated as an integral part of this Detailed Description of the Invention.

It should be understood that various alternatives to the embodiments of the invention described herein may be employed in practicing the invention. It is intended that the following claims define the invention and that circuits within the scope of these claims and their equivalents be covered thereby.

What is claimed is:

1. A frequency shift keying (FSK) modulator that receives a serial digital data input signal and generates a frequency modulated output signal representative of the input signal, the FSK modulator comprising:
    (a) a waveform generator that generates a carrier waveform;
    (b) a pulse generator that receives the digital data input signal and generates strobing pulses in response to transitions in the digital data input signal;
    (c) an envelope generator that receives the strobing pulses and generates frequency look-up codes in response thereto;
    (d) a frequency generator that includes a rate multiplier that responds to the frequency look-up codes by generating corresponding carrier frequency signals;
    (e) a frequency converter that responds to the carrier frequency signal by generating a corresponding digital bit stream; and
    (f) an output modulator stage that utilizes the digital bit stream to modulate the carrier waveform to provide the frequency modulated output signal.

2. A frequency shift keying (FSK) modulator that receives a serial digital data and signal and generates a frequency modulated output signal representative of the input signal, the FSK modulator comprising:
    (a) a waveform generator that generates a carrier waveform;
    (b) a data transition pulse generator that receives the digital data input signal and generates a strobing pulse in response to a transition in the digital data input signal;
    (c) a state counter that provides a counting sequence of counter state outputs, the counting sequence beginning with a "0th" counter state output upon initiation by receipt of a strobing pulse from the data transition pulse generator and continuing to an "nth" counter state output unless re-initiated to the "0th" counter state output be receipt by the state counter of a strobing pulse before reaching the "nth" counter state output, the counter state output remaining at the "nth" counter state output upon reaching the "nth" counter state output until the counting sequence is re-initiated to the "0th" counter state output upon receipt by the state counter of a subsequent strobing pulse;

(d) a decoder that responds to the counter state output of the state counted by providing an enable control signal;

(e) a frequency step counter that is reset to provide an initial frequency count output signal in response to a transition in the digital data input signal and that is enabled by the enable control signal provided by the decoder to begin providing a sequence of frequency count output signals at pre-defined intervals, the sequence of frequency count output signals beginning with the initial frequency count output signal and continuing to a maximum frequency count output signal, the frequency count output signal remaining at the maximum frequency count output signal upon reaching the maximum frequency count output signal until the frequency step counter is reset to provide the initial frequency count output signal in response to a transition in the digital data input signal;

(f) a frequency look-up element that responds to the sequence of frequency count output signals provided by the frequency step counted by providing a corresponding sequence of frequency look-up codes that ends with a destination frequency look-up code;

(g) a frequency generator that includes a rate multiplier that responds to the frequency look-up codes by providing corresponding carrier frequency signals;

(h) a frequency converter that responds to the carrier frequency signals by generating a corresponding digital bit stream; and (i) an output modulator stage that utilizes the digital bit stream to modulate the carrier waveform to provide the frequency modulated output signal.

* * * * *